US009875071B2

(12) United States Patent
Kuno et al.

(10) Patent No.: US 9,875,071 B2
(45) Date of Patent: Jan. 23, 2018

(54) IMAGE PROCESSING DEVICE

(75) Inventors: Masashi Kuno, Obu (JP); Hirotoshi Maehira, Nagoya (JP); Sadaaki Miyazaki, Nagoya (JP); Toru Mizuno, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 524 days.

(21) Appl. No.: 13/233,944

(22) Filed: Sep. 15, 2011

(65) Prior Publication Data
US 2012/0062909 A1 Mar. 15, 2012

(30) Foreign Application Priority Data

Sep. 15, 2010 (JP) .................................. 2010-207174

(51) Int. Cl.
*G06F 3/12* (2006.01)
*G06K 15/10* (2006.01)
*B41J 2/205* (2006.01)

(52) U.S. Cl.
CPC .......... *G06F 3/1215* (2013.01); *B41J 2/2052* (2013.01); *G06F 3/1232* (2013.01); *G06F 3/1247* (2013.01); *G06F 3/1285* (2013.01); *G06K 15/105* (2013.01)

(58) Field of Classification Search
CPC ............................ B41J 2/2052; G06K 15/105
USPC ..................................... 358/1.8, 1.9
See application file for complete search history.

(56) References Cited

U.S. PATENT DOCUMENTS

| 6,092,939 | A | * | 7/2000 | Nishikori | ............. | B41J 2/04505 |
| | | | | | | 347/188 |
| 6,139,127 | A | * | 10/2000 | Kato | ...................... | B41J 19/142 |
| | | | | | | 347/15 |
| 8,115,964 | B2 | * | 2/2012 | Tanaka | ........................... | 358/1.8 |
| 2002/0105558 | A1 | * | 8/2002 | Otsuki | ................... | B41J 2/2135 |
| | | | | | | 347/19 |

(Continued)

FOREIGN PATENT DOCUMENTS

| EP | 1228881 A2 | 8/2002 |
| EP | 2136291 A2 | 12/2009 |

(Continued)

OTHER PUBLICATIONS

Japan Patent Office, Notification of Reasons for Rejection for Japanese Patent Application No. 2010-207174 (counterpart Japanese patent application), dated Nov. 6, 2012.

(Continued)

*Primary Examiner* — Nicholas Pachol
(74) *Attorney, Agent, or Firm* — Merchant & Gould P.C.

(57) ABSTRACT

An image processing device may perform an analysis by utilizing target data representing a target image of a print target, so as to select, from among a plurality of types of print orders for printing the target image, one type of print order in which a print of the target image is presumed to be completed in the shortest time period. In each of the plurality of types of print orders, an area in the target image to be printed by the initial main scanning of the print head may be mutually different. The image processing device may create print data by utilizing the target data for causing a print performing unit to perform the print of the target image according to the selected one type of print order, and supply the print data to the print performing unit.

8 Claims, 9 Drawing Sheets

(56) References Cited

U.S. PATENT DOCUMENTS

| | | | |
|---|---|---|---|
| 2003/0112457 A1 | 6/2003 | Akiyama et al. | |
| 2004/0145616 A1* | 7/2004 | Takahashi | B41J 2/04526 347/14 |
| 2005/0207768 A1* | 9/2005 | Suzuki | G03G 15/5062 399/49 |
| 2006/0146080 A1* | 7/2006 | Fukuyasu | B41J 2/2132 347/12 |
| 2008/0297843 A1* | 12/2008 | Aoki | 358/1.15 |
| 2009/0046119 A1* | 2/2009 | Edamura | B41J 19/147 347/15 |
| 2009/0046124 A1* | 2/2009 | Edamura | B41J 19/147 347/40 |
| 2009/0231601 A1* | 9/2009 | Tanaka | G06K 15/102 358/1.8 |
| 2010/0005991 A1* | 1/2010 | Yoshida | B41J 11/42 101/486 |
| 2010/0214336 A1 | 8/2010 | Kuno | |
| 2011/0157635 A1* | 6/2011 | Takizawa | H04N 1/00347 358/1.15 |
| 2013/0163010 A1* | 6/2013 | Yoshida | H04N 1/4052 358/1.8 |

FOREIGN PATENT DOCUMENTS

| | | |
|---|---|---|
| JP | H08-118675 A | 5/1996 |
| JP | H09-141840 A | 6/1997 |
| JP | H10-166625 A | 6/1998 |
| JP | 2003-266657 A | 9/2003 |
| JP | 2006-159702 A | 6/2006 |
| JP | 2009-262346 A | 11/2009 |
| JP | 2010-100017 A | 5/2010 |

OTHER PUBLICATIONS

European Patent Office, extended European Search Report for European Patent Application No. 11180937.2 (counterpart European patent application), dated Mar. 7, 2013.

State Intellectual Property Office of the People's Republic of China, Notification of First Office Action for Chinese Patent Application No. 201110279340.9 (counterpart to above-captioned patent application), dated Nov. 5, 2013.

Chinese Office Action issued in CN 201110279340.9, dated Jun. 27, 2014.

European Office Action issued in related European Application No. 11180937.2, dated Nov. 27, 2017.

\* cited by examiner

Example of +90 Degrees State

Modified Embodiment of First Embodiment

FIG. 8A1
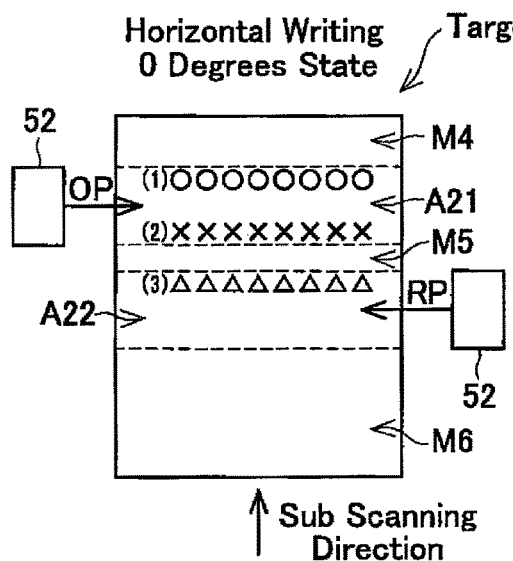
FIG. 8A2
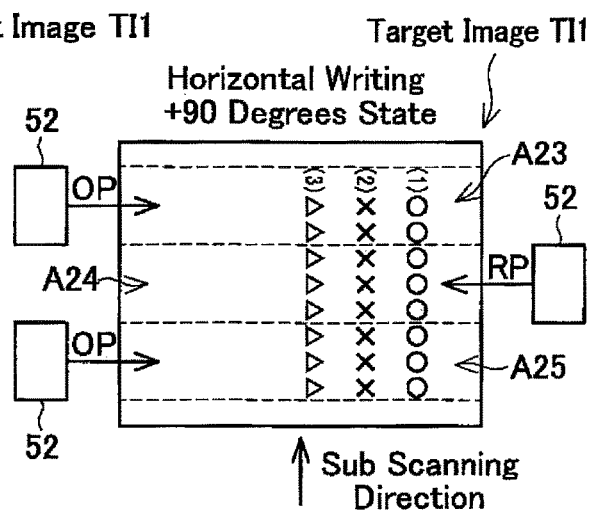
FIG. 8B1
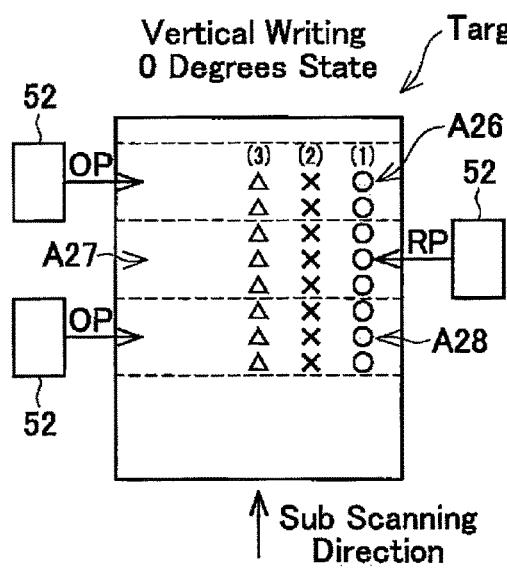
FIG. 8B2
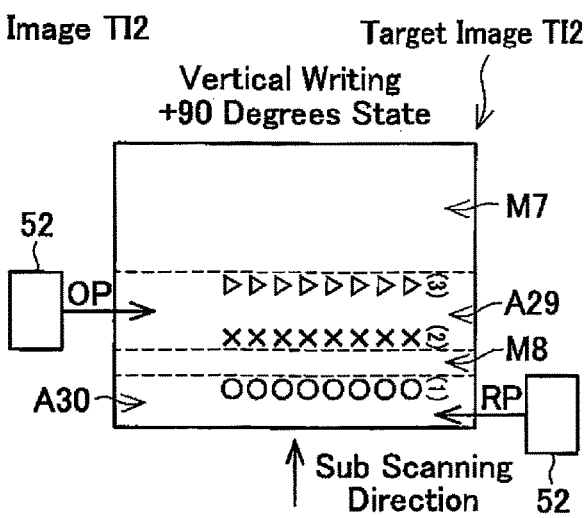

IMAGE PROCESSING DEVICE

CROSS-REFERENCE TO RELATED APPLICATIONS

This application claims priority to Japanese Patent Application No. 2010-207174, filed on Sep. 15, 2010, the contents of which are hereby incorporated by reference into the present application.

TECHNICAL FIELD

In the present specification, an image processing device for a print performing unit which performs a movement of a print head along a main scanning direction and a transfer of a print medium along a sub scanning direction so as to perform a print of an image on the print medium is taught.

DESCRIPTION OF RELATED ART

For example, a serial type ink jet printer is known which performs a movement of a print head along a main scanning direction (i.e., main scanning of the print head) and a transfer of a print medium along a sub scanning direction so as to performs a print of an image on the print medium. The serial type ink jet printer usually prints a target image of a print target on the print medium by performing a plurality of times of main scanning of the print head while transferring the print medium.

SUMMARY

It is desirable for a print of an image on a print medium to be performed quickly. In the present specification, a technique is presented which may allow the print of an image on the print medium to be performed quickly.

One technique disclosed in the present application is an image processing device for a print performing unit. The print performing unit may perform a movement of a print head along a main scanning direction and a transfer of a print medium along a sub scanning direction so as to perform a print of an image on the print medium. The image processing device may comprise a selection unit, a print data creation unit, and a supplying unit. The selection unit may be configured to perform an analysis by utilizing target data representing a target image of a print target, so as to select, from among a plurality of types of print orders for printing the target image, one type of print order in which a print of the target image is presumed to be completed in the shortest time period. In each of the plurality of types of print orders, an area in the target image to be printed by the initial main scanning of the print head may be mutually different. The print data creation unit may be configured to create print data by utilizing the target data. The print data may be data for causing the print performing unit to perform the print of the target image according to the selected one type of print order. The supplying unit may be configured to supply the print data to the print performing unit.

Furthermore, a control method and a computer program for realizing the function of the image processing device described above, and a non-transitory computer readable storage medium which stores the computer program, are also novel and useful. Further, a print system comprising the image processing device and the print performing unit described above is also novel and useful.

BRIEF DESCRIPTION OF THE DRAWINGS

FIG. 8A1 shows an example of a print order of a target image of a second embodiment.
FIG. 8A2 shows a comparative example of the second embodiment.
FIG. 8B1 shows an example of a print order of another target image of the second embodiment.
FIG. 8B2 shows a comparative example of the second embodiment.

EMBODIMENT

First Embodiment (Configuration of System)

Figure 1:
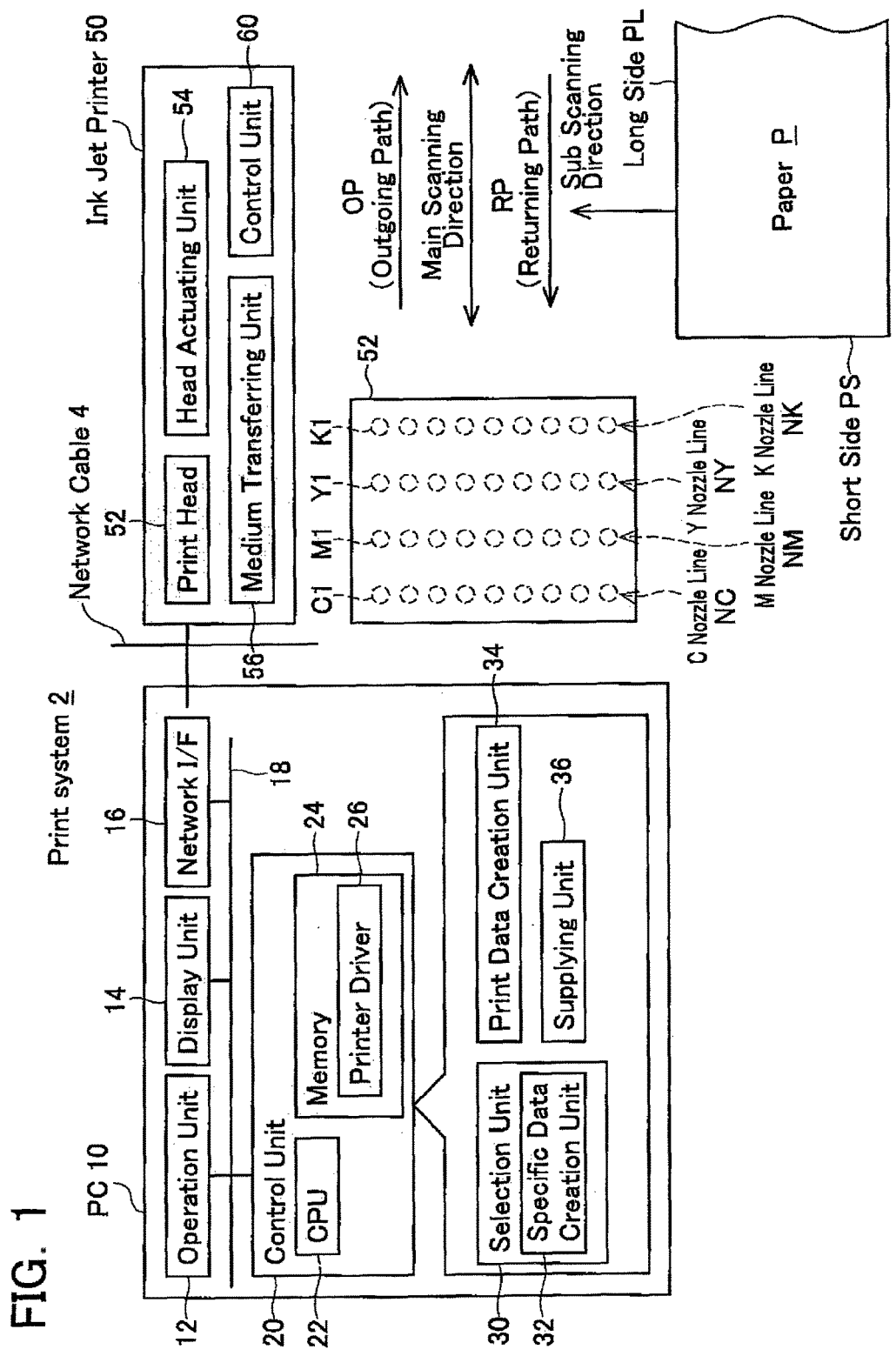
FIG. 1 shows the configuration of a print system.

As shown in FIG. 1, a print system 2 comprises a PC 10 and an ink jet printer 50 which is a peripheral of the PC 10. The PC 10 and the ink jet printer 50 are connected so as to be able to communicate via a network cable 4 (i.e., a network). Furthermore, below, the ink jet printer 50 may be simply called the "printer 50".

(Configuration of PC 10)

The PC 10 comprises an operation unit 12, a display unit 14, a network interface 16 and a control unit 20. The units 12, 14, 16, 20 are connected to a bus line 18. The operation unit 12 constituted of a keyboard and a mouse. A user can input various commands to the PC 10 by operating the operation unit 12. The display unit 14 is a display for showing various types of information. The network cable 4 is connected to the network interface 16.

The control unit 20 comprises a CPU 22 and a memory 24 such as a ROM, RAM, hard disk, etc. The CPU 22 performs various processes according to programs (e.g., a printer driver 26) stored in the memory 24. Functions of a selection unit 30, a print data creation unit 34 and a supplying unit 36 are realized by the CPU 22 performing processes according to the printer driver 26. Furthermore, the selection unit 30 comprises a specific data creation unit 32.

The memory 24 stores the printer driver 26 for the printer 50. The printer driver 26 is installed in the PC 10 from media packaged with the printer 50. Furthermore, in a modified embodiment, the printer driver 26 may be installed in the PC 10 via the Internet from a server provided by the vendor or manufacturer of the printer 50.

(Configuration of Ink Jet Printer 50)

The printer 50 is a so-called serial type ink jet printer. The printer 50 comprises a print head 52, a head actuating unit 54, a medium transferring unit 56 and a control unit 60. A simplified plan view of the print head 52 is shown in FIG. 1. As shown in the plan view, the print head 52 comprises four nozzle lines NC, NM, NY, NK for discharging ink droplets of four types of color that include three types of chromatic color cyan (C), magenta (M) and yellow (Y); and one type of achromatic color: black (K). The nozzle lines NC, NM, NY, NK are aligned asymmetrically in a main scanning direction, i.e., the movement direction of the print head 52, (i.e., the nozzle lines are not aligned symmetrically as is the case with NC, NM, NY, NK, NY, NM, NC). Furthermore, in a modified embodiment, the nozzle lines may be aligned symmetrically in the main scanning direction. The nozzle lines NC, NM, NY, NK are constituted of a plurality of nozzles for discharging ink droplets of corresponding colors. The plurality of nozzles C1, etc. that constitute one nozzle line NC are aligned along a sub scanning direction (i.e., the transfer direction of paper P). The other nozzles NM, NY, NK also have the same configuration. Further, the nozzle lines NC, NM, NY, NK are configured such that the four nozzles CMYK are located on a straight line extending along the main scanning direction. For example, the four nozzles C1, M1, Y1, K1 are located on a straight line extending along the main scanning direction.

The head actuating unit 54 moves the print head 52 back and forth along the main scanning direction according to a command from the control unit 60 (i.e., performs the main scanning of the print head 52). Furthermore, in the present embodiment, an outgoing path and a returning path of the main scanning of the print head 52 are represented respectively by OP (Outgoing Path) and RP (Returning Path). Further, the head actuating unit 54 causes ink droplets to be discharged from the print head 52 according to a command from the control unit 60.

According to a command from the control unit 60, the medium transferring unit 56 takes out the paper P housed in a paper input tray from that paper input tray and transfers the paper P along the sub scanning direction, which is a direction perpendicular to the main scanning direction. The paper P has a rectangle shape (e.g., A4 size, Letter size, etc.) that includes a short side PS and a long side PL. In the present embodiment, the medium transferring unit 56 is assumed to be capable of transferring the paper P such that the short side PS of the paper P is along the sub scanning direction (the upper direction of FIG. 1) and is assumed to be incapable of transferring the paper P such that the long side PL of the paper P is along the sub scanning direction.

The control unit 60 controls the operation of the head actuating unit 54 and the medium transferring unit 56 according to print data supplied from the PC 10.

(Outline of Printing Target Image TI (Target Image) of Print Target)

By operating the operation unit 12, the user of the PC 10 can utilize an application program such as document composition software, spreadsheet software, drawing software, etc. Further, the user can input, to the operation unit 12, an instruction for printing an image represented by data created by the application. In the present embodiment, the image of the print target is called "target image TI" (Target Image), and data representing the target image (i.e., the data created by the application) is called "target data".

Figure 2A:
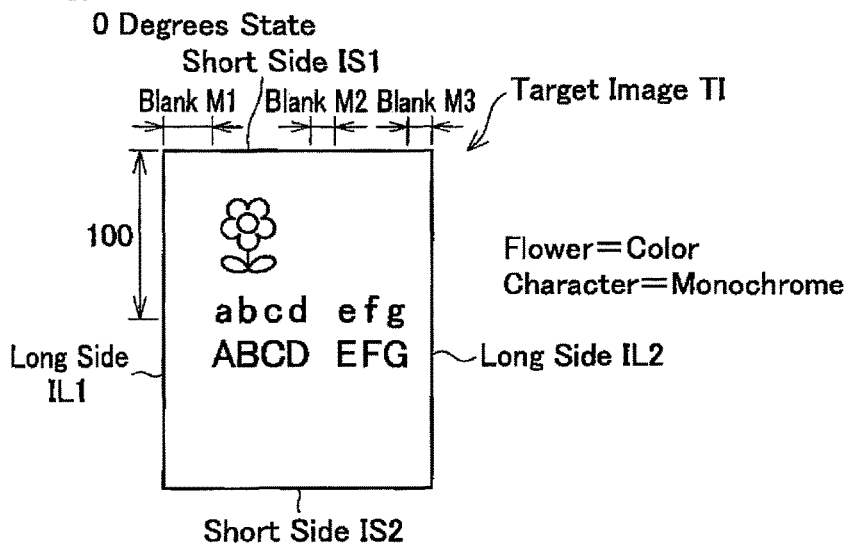
FIG. 2A shows an example of a target image.

FIG. 2A shows an example of the target image TI. The up-down direction and the left-right direction of, the target image TI have been determined in the target data created by the application. For example, when the target image TI is to be displayed in the display unit 14 of the PC 10, the target image TI is usually displayed such that the up-down direction of the target image TI determined in the target data is along the up-down direction of the display unit 14 (i.e., such that the left-right direction of the target image TI is along the left-right direction of the display unit 14). The target image TI of FIG. 2A is in a state in which the up-down direction and the left-right direction of the target image TI matches the up-down direction and left-right direction of the surface of the paper of FIG. 2. Below, the target image TI being in the state of FIG. 2A is called a "target image TI being in a 0 degrees state".

The target image TI has a rectangle shape which includes short sides IS1, IS2 that extend along the left-right direction of the target Image TI, and long sides IL1, IL2 that extend along the up-down direction of the target image TI. Furthermore, in the present embodiment, the target image TI is not an image to be printed across two or more sheets of paper, but is an image to be printed on one sheet of paper. That is, the target image TI is an image for one page. Further, in the present embodiment, the description will continue using, as an example, the case where the print is performed such that the long sides IL1, IL2 of the target image TI (i.e., the up-down direction of the target image TI) are along the long side PL of the paper P.

The target image TI includes a flower illustration and a character string of letters (a to g, A to G). The flower illustration is a color image represented using chromatic colors, and the character string of letters is a monochrome image represented using achromatic color (specifically, black). In the present embodiment, a case is assumed in which the flower illustration is printed utilizing CMYK ink, and the character string of letters is printed utilizing K ink.

As described above, in the present embodiment, the paper P is transferred such that the short side PS of the paper P is along the sub scanning direction, and printing is performed such that the long sides IL1, IL2 of the target image TI are along the long side PL of the paper P. Consequently, the printer 50 cannot perform an appropriate print if print data representing the target image TI in the 0 degrees state shown in FIG. 2A is created. Consequently, in the present embodiment, the PC 10 selectively creates print data, from among print data representing the target image TI in a +90 degrees state shown in FIG. 2B and print data representing the target image TI in a −90 degrees state shown in FIG. 2C, which allows printing to be performed rapidly. A state in which the target image TI in the 0 degrees state has been rotated 90 degrees in a clockwise direction is the target image TI in the +90 degrees state, and a state in which the target image TI in the 0 degrees state has been rotated 90 degrees in an anti-clockwise direction is the target image TI in the −90 degrees state.

(Preconditions for Printing of Target Image TI)

In the present embodiment, the printing of the target image TI is performed such that the following conditions (A) to (D) are satisfied.

(A) Each of a plurality of unit areas in the target image TI is printed by performing one time of main scanning of the print head 52. For example, the target image TI in the +90 degrees state of FIG. 2B includes three unit areas A1 to A3. The three unit areas A1 to A3 are printed sequentially from the long side IL1 to the long side IL2 by three times of main scanning of the print head 52. That is, first the unit area A1 is printed, then the unit area A2 is printed, and finally the unit area A3 is printed. Further, for example, the target image TI in the −90 degrees state of FIG. 2C includes three unit areas A4 to A6. The three unit areas A4 to A6 are printed sequentially from the long side IL2 to the long side IL1 by three times of main scanning of the print head 52. Furthermore, the width of each unit area (e.g., A1) in the sub scanning direction is the same as the length of one nozzle line of the print head 52 (i.e., the distance between a most upstream nozzle in the sub scanning direction and a most downstream nozzle in the sub scanning direction). Further, below, the printing shown in FIG. 2B and in FIG. 2C may respectively be called "+90 degrees state print" and "−90 degrees state print".

(B) From among the plurality of unit areas in the target image TI, a unit area that includes a color image is printed by performing one time of outgoing path OP main scanning of the print head 52. For example, the target image TI in the +90 degrees state includes the unit area A1 that includes a color image. Consequently, in the +90 degrees state print, the unit area A1 is printed by performing outgoing path OP main scanning. Further, for example, the target image TI in the −90 degrees state includes the unit areas A5, A6 that include a color image. Consequently, in the −90 degrees state print, the unit areas A5, A6 are each printed by performing outgoing path OP main scanning.

As described above, in the present embodiment, outgoing path OP main scanning of the print head 52 is utilized in a fixed manner for printing a unit area that includes a color image. The reason is as follows. In case a color image is printed, the printer 50 can usually form one dot on the paper utilizing ink droplets having two or more types of colors from among the CMYK four types of colors. For example, in case of printing the leaf portion (i.e., green) in the flower illustration of the target image TI, the printer 50 causes a cyan ink droplet and a yellow ink droplet to adhere to the same location on the paper, forming one green dot on the paper. If outgoing path OP main scanning is adopted for forming the green dot, as is clear from the positional relationship of the nozzle line NC and the nozzle line NY of FIG. 1, after, for example, the yellow ink droplet discharged from the nozzle Y1 have adhered to a predetermined location on the paper, the cyan ink droplet discharged from the nozzle C1 adhere to the predetermined location. That is, one green dot is formed by the cyan ink droplet adhering above the yellow ink droplet. However, if returning path RP main scanning were to be adopted for forming the green dot, after, for example, the cyan ink droplet discharged from the nozzle C1 have adhered to the predetermined location on the paper, the yellow ink droplet discharged from the nozzle Y1 adhere to the predetermined location. That is, one green dot is formed by the yellow ink droplets adhering above the cyan ink droplet. Since the cyan and yellow ink droplets for forming the one green dot adhere to the paper in a differing sequence in the case of adopting outgoing path OP main scanning and in the case of adopting returning path RP main scanning, the colors of the green dot may appear to differ. In order to avoid this phenomenon, in which the colors of the printed image appear to differ due to the differing sequence in which the two or more types of colors of ink droplets adhere to the paper, in the present embodiment, outgoing path OP main scanning is utilized in a fixed manner in printing the unit area that includes a color image.

(C) From among the plurality of unit areas, a unit area that includes only a monochrome image is printed by selectively performing either one time of outgoing path OP main scanning of the print head 52 or one time of returning path RP main scanning of the print head 52. For example, the target image TI in the +90 degrees state includes the unit areas A2, A3 that include only monochrome images. Consequently, in the +90 degrees state print, each of the unit areas A2, A3 is printed by selectively performing either outgoing path OP main scanning or returning path RP main scanning. Further, for example, the target image TI in the −90 degrees state includes the unit area A4 that includes only a monochrome image. Consequently, in the −90 degrees state print, the unit area A4 is printed by selectively performing either outgoing path OP main scanning or returning path RP main scanning.

Furthermore, unlike the printing of a unit area that includes a color image, since only black ink is utilized in the printing of a unit area that includes only a monochrome image, the color of a dot will appear the same regardless of whether outgoing path OP main scanning or returning path RP main scanning is adopted. Consequently, in the present embodiment, either outgoing path OP main scanning or returning path RP main scanning is utilized selectively in the printing of the unit area that includes only the monochrome image.

Next, the method will be described below for selecting one of outgoing path OP main scanning or returning path RP main scanning in order to print the unit area that includes only a monochrome image. In the present embodiment, main scanning which enables rapid printing is selected from among, outgoing path OP main scanning and returning path RP main scanning. For example, in the +90 degrees state print, outgoing, path OP main scanning is adopted for printing the unit area A1 that includes a color image. If outgoing path OP main scanning were to be adopted for printing the unit area A2 that is next to be printed, the print head 52 would need to be returned to a starting location of the outgoing path OP main scanning. That is, returning path RP main scanning would need to be performed without ink droplets being discharged from the print head 52. Whereas, if returning path RP main scanning is adopted for printing the unit area A2, it is not necessary to return the print head 52 to the starting location of the outgoing path OP main scanning. Consequently, in the present embodiment, returning path RP main scanning is adopted for printing the unit area A2. Similarly, outgoing path OP main scanning is adopted for printing the unit area A3.

(D) The control unit 20 of the PC 10 sequentially determines the unit areas A1 to A3, etc. such, that, wherever possible, blank areas M1, M2, M3 (see FIG. 2A) are not included in the unit areas A1 to A3, etc.

For example, when the control unit 20 determines the unit area A1 that is to be printed first within the target image TI in the +90 degrees state, the unit area A1 is determined such that the blank area M1 adjacent to the long side IL1 is not included in the unit area A1. That is, the control unit 20 determines the unit area A1 such that, in case an edge of the target image TI (i.e., the upper edge of FIG. 2B) includes the blank area M1, the blank area M1 is not included in the unit area A1. When the control unit 20 determines the unit area A2 that is to be printed next, the unit area A2 is determined such that the unit area A2 is adjacent to the unit area A1 because the letters C, D (further, c, d) are represented continuously from the unit area A1 toward the long side IL2. In, this case, the unit area A2 includes the blank area M2 (see FIG. 2A). Further, when the control unit 20 determines the unit area A3 that is to be printed next, the unit area A3 is determined such that the unit area A3 is adjacent to the unit area A2 because the letters E, F (further, e, f) are represented continuously from the unit area A2 to the long side IL2. In this case, the unit area A3 includes the blank area M3 (see FIG. 2A).

Similarly, the control unit 20 sequentially determines the unit areas A4 to A6 for the target image TI in the −90 degrees state. In particular, when the control unit 20 determines the unit area A5 following the unit area A4 after having determined the unit area A4, because the blank area M2 exists at the unit area A5-side of the unit area A4 (i.e., at the lower side of the unit area A4 in FIG. 2C), the control unit 20 determines the unit area A5 such that the unit area A5 does not include the blank area M2.

Thus, compared to a configuration in which the condition (D) is not adopted (a configuration in which blank areas are not considered), it is possible, when the condition (D) is adopted, to prevent the color image (the flower illustration) from extending over a plurality of differing unit areas. That is, when the condition (D) is adopted, the number of unit areas that include the color image can be reduced. Consequently the number of times of main scanning needed for a print can be reduced.

Figure 2B:
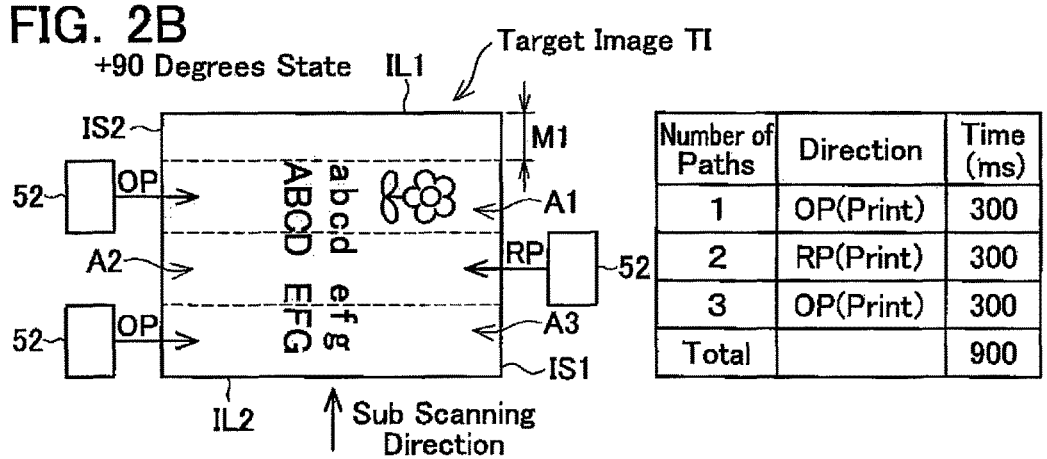
FIG. 2B shows an example of a print order of the target image.
Figure 2C:
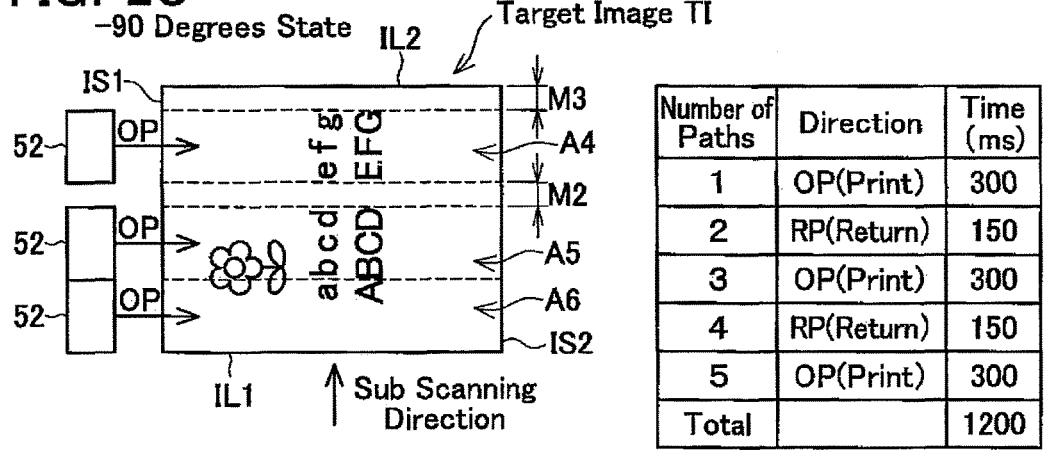
FIG. 2C shows another example of a print order of the target image.

By assuming the conditions (A) to (D), the control unit 20 can determine a print order for printing the target image TI in the +90 degrees state (i.e., the unit areas A1→A2→A3 of FIG. 2B), and a print order for printing the target image TI in the −90 degrees state (i.e., the unit areas A4→A5→A6 of FIG. 2C). As is clear from FIGS. 2B, 2B, in the print order for the +90 degrees state, the unit area A1 is printed in the initial main scanning, and in the print order for the −90 degrees state, the unit area A4 is printed in the initial main scanning. Thus, in the plurality of types of print order (the print order for the +90 degrees state and the print order for the −90 degrees state) of the present embodiment, the areas to be printed in the initial main scanning mutually differ.

(Processes Performed by the Printer Driver 26)

Figure 3:
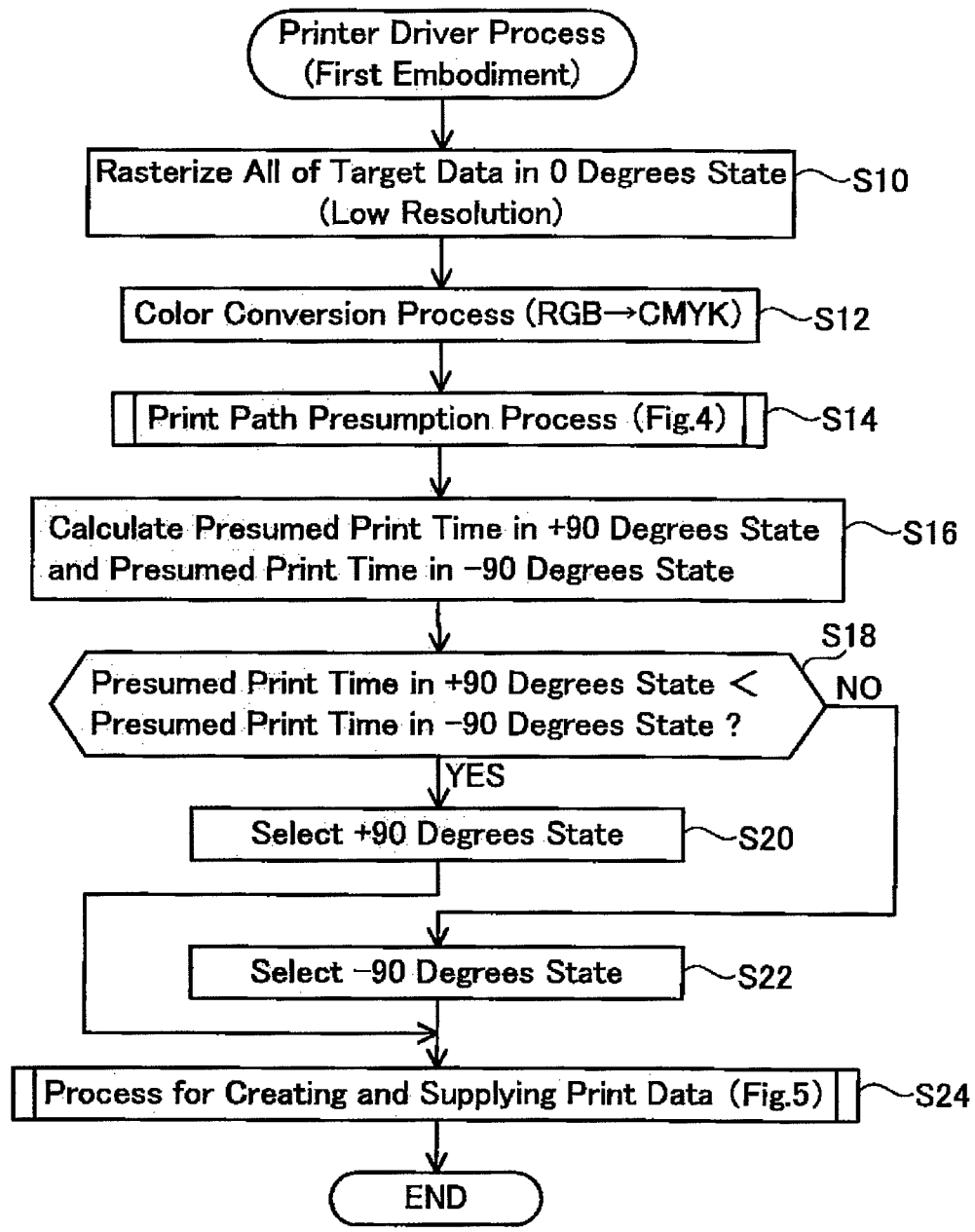
FIG. 3 shows a flowchart of a printer driver process of a first embodiment.

In case the user of the PC 10 inputs an instruction to the operation unit 12 for printing the target data, the control unit 20 performs the processes shown in the flowchart of FIG. 3 according to the printer driver 26. Furthermore, the print instruction includes a print resolution specified by the user. In the present embodiment, the contents of the processes will be described using as an example the case where printing was instructed such that the long sides IL1, IL2 of the target image TI for one page are along the long side PL of the paper P.

First, in S10 the specific data creation unit 32 (see FIG. 1) rasterizes all of the target data, creating RGB data representing the target image TI. Each of a plurality of pixels configuring the RGB data is represented by 256 tone RGB values. Furthermore, in S10, the specific data creation unit 32 does not create RGB data representing the target image TI in the 90 degrees state or the −90 degrees state, but creates RGB data representing the target image TI in the 0 degrees state. Further, in S10, the specific data creation unit 32 creates RGB data that has a lesser number of pixels than a number of pixels corresponding to the print resolution instructed by the user. For example, in case the print resolution instructed by the user is 600 dpi×600 dpi, in S10, the specific data creation unit 32 creates RGB data having a number of pixels corresponding to a 150 dpi×150 dpi print resolution.

Figure 6A:
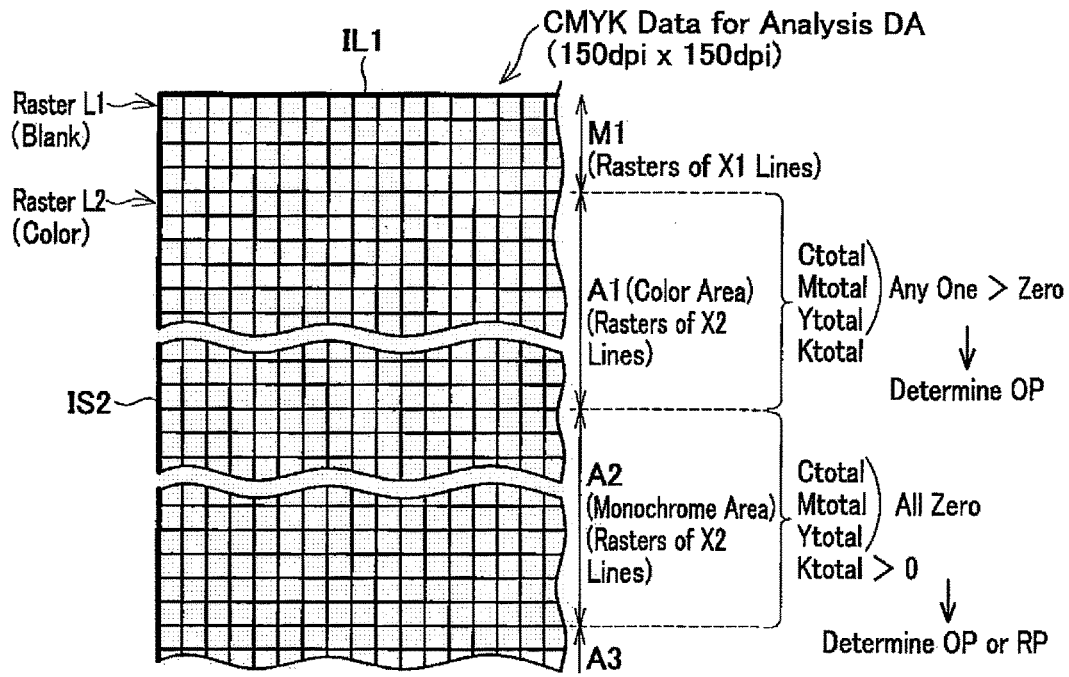
FIG. 6A schematically shows CMYK data for analysis.

Next, in S12 the specific data creation unit 32 performs a color conversion process on the RGB data, creating CMYK data for analysis DA (see FIG. 6A). Furthermore, in order to make it easy to understand the contrast with CMYK data for print DP of FIG. 6B, which will be described below, FIG. 6A shows CMYK data for analysis DA representing the target image TI in the +90 degrees state. However, CMYK data for analysis DA representing the target image TI in the 0 degrees state is actually created from the RGB data representing the target image TI in the 0 degrees state. That is, actually, CMYK data for analysis DA is created that has been rotated anti-clockwise 90 degrees from the state of FIG. 6A. Furthermore, each of the plurality of pixels that constitutes the CMYK data for analysis DA is represented by 256 tone CMYK values. Further, the number of pixels of the CMYK data for analysis DA is identical to the number of pixels of the RGB data.

Next, in S14 the selection unit 30 (see FIG. 1) analyzes the CMYK data for analysis DA, and performs a print path presumption process. In the print path presumption process, the selection unit 30 specifies the number of times of main scanning necessary for the +90 degrees state print (may also be called "number of paths" below) and the number of times of main scanning necessary for the −90 degrees state print, and writes "number of paths" and "direction" into the tables shown in FIGS. 2B, 2C.

(Print Path Presumption Process (FIG. 4))

Figure 4:
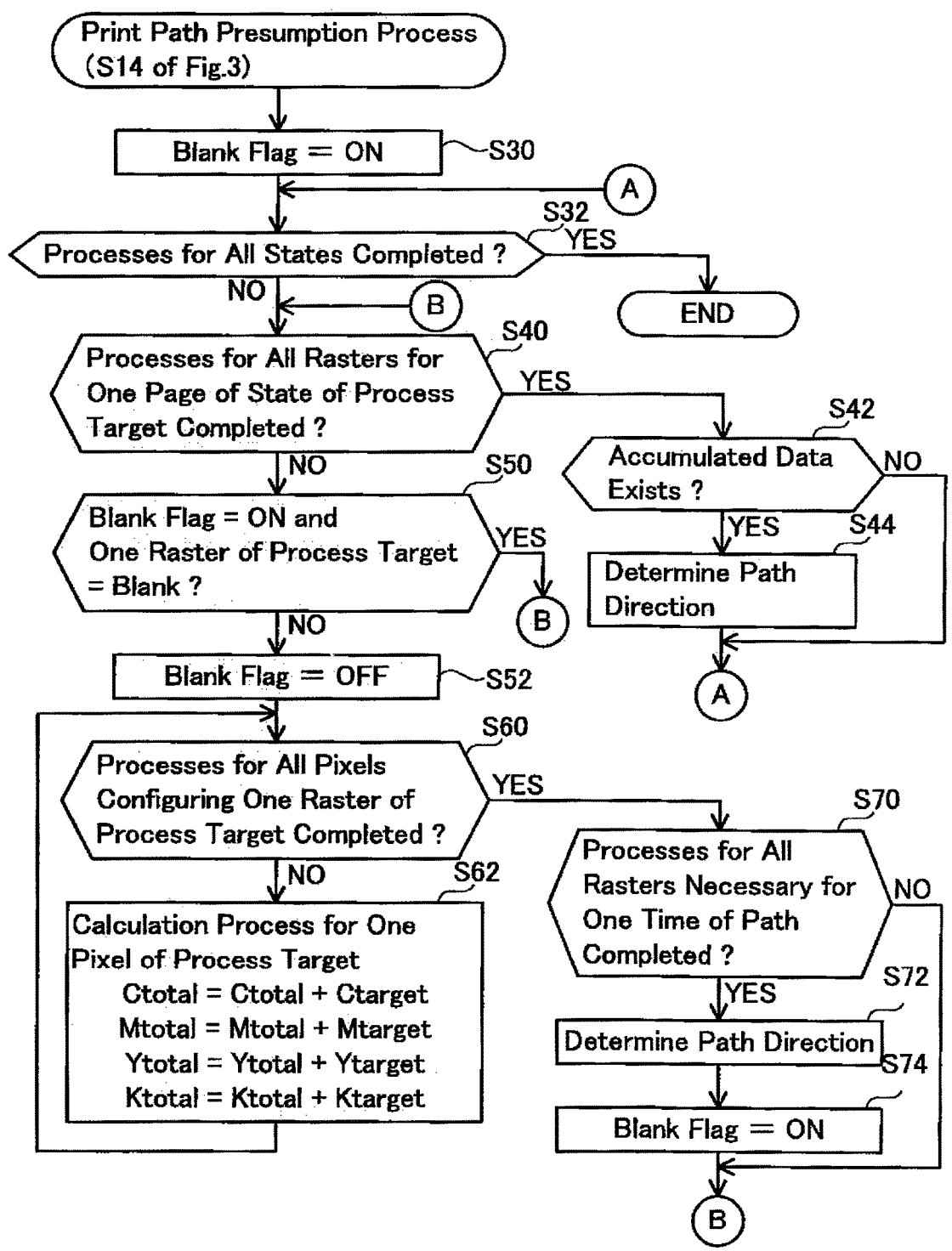
FIG. 4 shows a flowchart of a print path presumption process.

At the time of starting the process of FIG. 4 (the time of S40), Ctotal, Mtotal, etc. (to be described) are set to "0". As shown in FIG. 4, in S30 the selection unit 30 sets a blank flag to ON. The blank flag is utilized to specify a blank area (M1, etc. of FIG. 2). Next, in S32 the selection unit 30 determines whether analysis processes for both the +90 degrees state and the −90 degrees state (i.e., the processes from S40 onward) have been completed. In the case of NO here, the selection unit 30 selects one state that has not been processed as a state of process target, and proceeds to S40. Furthermore, in the present embodiment, the selection unit 30 first selects the +90 degrees state, and then selects the −90 degrees state. Consequently, below, the contents of the analysis processes for the +90 degrees state will be described first, and then the contents of the analysis processes for the −90 degrees state will be described.

(Analysis Processes for +90 Degrees State)

In S40, the selection unit 30 determines whether, for the state of the process target (i.e., the +90 degrees state), the analysis processes (i.e., the processes from S50 onward) have been completed of all rasters that constitute the CMYK data for analysis DA (i.e., for data representing one page of the target image TI). Furthermore, in the present embodiment, one raster is configured by a plurality of pixels aligned in the direction in which the long side (e.g., IL1) of the target image TI extends. For example, as shown in FIG. 6A, one raster L1 is configured by the plurality of pixels that include the long side IL1 of the target image TI.

In the case of NO in S40, the selection unit 30 selects one raster of the process target from among the CMYK data for analysis DA, and proceeds to S50. In the analysis processes for the +90 degrees state, the selection unit 30 sequentially selects the rasters of the process target from the long side IL1 to the long side IL2 of the target image TI. Consequently, the selection unit 30 selects the raster L1 of FIG. 6A as the initial raster of the process target, performs the processes from S50 onward, then selects the raster, adjacent to the raster L1 as the raster of the process target, and re-performs the processes from S50 onward. Furthermore, in the analysis processes for the −90 degrees state, the selection unit 30 sequentially selects the rasters of the process target from the long side IL2 to the long side IL1 of the target image TI. That is, the selection unit 30 sequentially selects the rasters of the process target in the sequence of the print direction of the target image TI (i.e., in the direction from the long side IL1 to the long side IL2 in the +90 degrees state (see FIG. 2B), and in the direction from the long side IL2 to the long side IL1 in the −90 degrees state (see FIG. 2C)).

In S50, the selection unit 30 determines whether the blank flag is ON, and whether the one raster of the process target is blank. In S50, in case all the values of CMYK of the pixels configuring the one raster of the process target are "0", the selection unit 30 determines that one raster of the process target is blank. That is, in S50, in case any of the values of CMYK of one pixel configuring the one raster of the process target is "1" or more, the selection unit 30 determines that the one raster of the process target is not blank.

As described above, the selection unit 30 selects the raster L1 as the initial raster of the process target. In S30, ON is set as the blank flag and, further, since the raster L1 constitutes the blank area M1 (see FIG. 6A), the selection unit 30 determines YES in S50, and returns to S40. In this case, ON is maintained as the blank flag. Next, the selection unit 30 again determines NO in S40, and selects the raster adjacent to the raster L1 as the raster of the process target. In this case, as well, since the raster of the process target constitutes the blank area M1, the selection unit 30 again determines YES in S50, and returns to S40. Similarly, YES is determined in S50 for the other rasters that constitute the blank area M1. In the present embodiment, as shown in FIG. 6A, YES is determined in S50 for each of the rasters of X1 lines that constitute the blank area M1.

A raster L2 of FIG. 6A represents a part of the letter "A" (see FIG. 2B) of the target image TI. Consequently, in case the raster of the process target is the raster L2, the selection unit 30 determines NO in S50, and proceeds to S52. In S52, the selection unit 30 sets the blank flag to OFF.

Next, in S60, the selection unit 30 determines whether analysis processes (i.e., a calculation process of S62) have been completed for all the pixels configuring the raster of the process target (e.g., L2). In the case of NO in S60, the selection unit 30 selects, from among the plurality of pixels configuring the raster of the process target, a pixel for which the calculation process of S62 has not been performed as the pixel of the process target. Next, in S62, the selection unit 30 adds a C value of the pixel of the process target (Ctarget) to the current total of C (Ctotal) so as to calculate a new total of C (Ctotal). Furthermore, in the first process of S62, "0" is set as the current Ctotal. In S62, the selection unit 30 further calculates new totals (Mtotal, Ytotal and Ktotal) for each of MYK in the same way as for C.

When S62 ends, the process returns to S60. Thus, the selection unit 30 performs the calculation process of S62 for all the pixels configuring the raster of the process target. Consequently, the selection unit 30 calculates the totals (Ctotal, etc.) for CMYK for all the pixels configuring the raster of the process target. In this case, the selection unit 30 determines YES in S60, and proceeds to S70.

In S70, the selection unit 30 determines whether the analysis processes (i.e., the processes of S60 and S62) for all rasters necessary for printing one time of path (i.e., one time of main scanning) have been completed. The number of rasters necessary for printing one time of path is specified based on the print resolution (150 dpi×150 dpi) corresponding to the CMYK data for analysis DA. In the present embodiment, as shown in FIG. 6A, the number of rasters necessary for printing one time of path is X2 lines.

In case the raster of the process target is the raster L2, the selection unit 30 determines NO in S70, and returns to S40. In this case, the selection unit 30 determines NO in S40, then selects the raster adjacent to the raster L2 as the raster of the process target. In this case, since the blank flag is being maintained as OFF, the selection unit 30 determines NO in S50, maintains the blank flag as OFF in S52, and after performing S60 and S62, re-performs S70. Thus, the selection unit 30 calculates the totals (Ctotal, etc.) for CMYK for all the pixels configuring the rasters of X2 lines necessary for printing one time, of path. That is, the selection unit 30 calculates the totals (Ctotal, etc.) for CMYK for all the pixels configuring the rasters of X2 lines corresponding to one unit area (e.g., A1). In this case, the selection unit 30 determines YES in S70, and proceeds to S72.

In S72, the selection unit 30 determines whether outgoing path OP main scanning is to be performed, or whether either outgoing path OP main scanning or returning path RP main scanning is to be performed selectively. Specifically, in case at least one total (e.g., Ctotal) from among the chromatic colors CMY is greater than "0", the selection unit 30 determines that outgoing path OP main scanning is to be performed. Further, in case all the totals from among CMY are "0" (i.e., in case only the total of the achromatic color K (Ktotal) is greater than "0"), the selection unit 30 determines that either outgoing path OP main scanning or returning path RP main scanning is to be performed selectively.

For example, when the decision of S72 is performed, for the unit area A1 that includes a color image, at least one total from among CMY is greater than "0". In particular, in the present embodiment, since the flower illustration includes a green leaf, the two totals of at least C and Y will each usually be greater than "0". Consequently, the selection unit 30 determines that outgoing path OP main scanning is to be performed. In this case, the selection unit 30 writes, into the table shown in FIG. 2B, information relating to main scanning for printing the unit area A1. That is, the selection unit 30 writes "1" into the "number of paths" column, and writes "OP" into the "direction" column. Further, since the outgoing path OP main scanning written here is the main scanning for printing the unit area A1 while the print head 52 discharges ink droplets, the selection unit 30 appends information indicating "print" (represented as (Print) below) to the "OP" written in the "direction" column.

When S72 ends, the selection unit 30 resets the totals of CMYK (Ctotal, etc.) to "0". Next, in S74, the selection unit 30 sets the blank flag to ON, and returns to S40. Thus, the processes from S50 onward are performed for each of the unit areas A2, A3.

When the decision of S72 is performed for the unit area A2 that includes only the monochrome image, since all of the totals for CMY are "0", the selection unit 30 determines that either outgoing path OP main scanning or returning path RP main scanning is to be performed selectively. The selection unit 30 has already determined that outgoing path OP main scanning is to be performed for the unit area A1 that is printed before the unit area A2. If outgoing path OP main scanning were to be performed for printing the unit area A2, returning path RP main scanning (return main scanning) would be required before performing the outgoing path OP main scanning, thus increasing the number of times of main scanning needed for printing. In order to reduce the number of times of main scanning needed for printing, the selection unit 30 determines that returning path RP main scanning is to be performed for the unit area A2. In this case, the selection unit 30 writes "2" into the "number of paths" column of the table shown in FIG. 2B and writes "RP (Print)" into the "direction" column.

Similarly, when the decision of S72 is, performed for the unit area A3 that includes only a monochrome image, the selection unit 30 determines that either outgoing path OP main scanning or returning path RP main scanning is to be performed selectively. Further, the selection unit 30 determines that outgoing path OP main scanning is to be performed for the unit area A3. In this case, the selection unit 30 writes "3" into the "number of paths" column of the table shown in FIG. 2B and writes "OP (Print)" into the "direction" column.

As shown in FIG. 2B, the unit area A3 includes the long side IL2 of the target image TI. Consequently, in S40, the selection unit 30 determines, for the +90 degrees state, that the analysis processes have been completed for all rasters that configure the CMYK data for analysis DA (i.e., determines YES in S40).

In the case of YES in S40, in S42 the selection unit 30 determines whether one total from among CMYK is greater than "0". For example, at a stage where the analysis processes have been completed for a number of rasters less than the rasters of X2 lines (see S70 above), YES can be determined in S40. In this type of situation, YES can be determined in S42 because one total from among CMYK can be greater than "0" in the analysis processes for the number of rasters less than the rasters of X2 lines. In the case of YES in S42, in S44 the selection unit 30 performs the same process as S72 above (determines the path direction, writes into the table, etc.) and, further, resets the totals of CMYK (Ctotal, etc.) to "0". In the case of NO in S42, or when S44 ends, the selection unit 30 returns to S32.

(Analysis Processes for −90 Degrees State)

At the stage where the analysis processes (i.e., the processes from S40 onward) for the +90 degrees state have been completed, NO is determined in S32 because the analysis processes for the −90 degrees state have not been completed. In this case, the selection unit 30 selects the −90 degrees state as the state of the process target, and performs the analysis processes for the −90 degrees state. The analysis processes for the −90 degrees state are performed in the same manner as the analysis processes for the +90 degrees state. Consequently, the table shown in FIG. 3C is created.

For example, when the decision of S72 is performed for the unit area A4 that includes only a monochrome image, the selection unit 30 determines that either outgoing path OP main scanning or returning path RP main scanning is to be performed selectively. In this case, the selection unit 30 writes "1" into the "number of paths" column of the table shown in FIG. 2C and writes "OP (Print)" into the "direction" column. Furthermore, in the present embodiment, outgoing path OP must be adopted as the initial main scanning for printing the target image TI. Consequently, "OP" is written into the "direction" column for the unit area A4 which, in the target image TI of the −90 degrees state, is printed in the initial main scanning.

Furthermore, the blank area M2 is adjacent to the unit area A4. Consequently, in S50, which is performed after the decision of S72 for the unit area A4 has been completed, the selection unit 30 determines that the blank flag is ON and that the raster of the process target is blank (i.e., determines YES in S50). Thus, the analysis processes of the unit area A5 are performed such that the blank area M2 is not included in the unit area A5.

When the decision of S72 is performed for the unit area A5 that includes a color image, the selection unit 30 determines that outgoing path OP main scanning is to be performed. However, the selection unit 30 has already determined that outgoing path OP main scanning is to be performed for the unit area A4 that is printed before the unit area A5. Consequently, the print head 52 needs to be returned to the starting location of the outgoing path OP main scanning. As a result, the selection unit 30 first writes, into the table shown in FIG. 2C, information relating to main scanning for returning the print head 52. That is, the selection unit 30 writes "2" into the "number of paths" column and writes "RP" into the "direction" column. Further, since the returning path RP main scanning written here is return main scanning performed without the print head 52 discharging ink droplets, the selection unit 30 appends information indicating "return" (represented as (Return) below) to "RP" that is written in the "direction" column. Next, the selection unit 30 writes, into the table shown in FIG. 2C, information relating to main scanning for printing the unit area A5. That is, the selection unit 30 writes "3" into the "number of paths" column and writes "OP (Print)" into the "direction" column.

Similarly, when the decision of S72 is performed for the unit area A6 that includes a color image, the selection unit 30 writes, into the table shown in FIG. 2C, information relating to main scanning for returning the print head 52 ("4" and "RP (Return)"), and information relating to main scanning for printing the unit area A6 ("5" and "OP (Print)").

When the analysis processes for the −90 degrees state end, YES is determined in S32. Thus, the print path presumption process ends.

(Continuation of Printer Driver Process (FIG. 3))

When the print path presumption process (FIG. 4) of S14 of FIG. 3 ends, in S16 the selection unit 30 calculates a presumed print time in the +90 degrees state and a presumed print time in the −90 degrees state. Specifically, the selection unit 30 calculates the presumed print time in the +90 degrees state utilizing the table of FIG. 2B created in the analysis processes for the +90 degrees state, and calculates the presumed print time in the −90 degrees state utilizing the table of FIG. 2C created in the analysis processes for the −90 degrees state. A first time period (300 (ms) in the present embodiment) is determined in advance as the time necessary for one time of main scanning performed while the print head 52 is discharging ink droplets, and a second time period (150 (ms) in the present embodiment), which is shorter than the first time period, is determined in advance as the time necessary for one time of main scanning performed while the print head 52 is not discharging ink droplets (i.e., return main scanning). Consequently, as shown in FIGS. 2B, 2C, the selection unit 30 calculates 900 (ms) as the presumed print time in the +90 degrees state, and calculates 1200 (ms) as the presumed print time in the −90 degrees state. Furthermore, in a modified embodiment, the selection unit 30 may further take into consideration not only the first and second time periods, but also other time periods such as the transfer time of the paper, etc.

Next, in S18 the selection unit 30 compares the presumed print time in the +90 degrees state and the presumed print time in the −90 degrees state. In case the presumed print time in the +90 degrees state is shorter than the presumed print time in the −90 degrees state (in case of YES in S18), in S20 the selection unit 30 selects the print order for the +90 degrees state (see FIG. 2B). On the other hand, in case the presumed print time in the −90 degrees state is shorter than the presumed print time in the +90 degrees state (in case of NO in S18), in S22 the selection unit 30 selects the print order for the −90 degrees state (see FIG. 2C). When S20 and S22 end, the selection unit 30 proceeds to the process for creating and supplying print data of S24 (FIG. 5).

Furthermore, as is clear from the tables of FIGS. 2B, 2C, the presumed print time is shorter for the case that has a lesser number of paths necessary for printing the target image TI. Consequently, in S18 to S22, the selection unit 30 selects the print order that has the least number of paths necessary for printing the target image TI. Furthermore, in a modified embodiment, the selection unit 30 may compare the number of paths of the tables of FIGS. 2B, 2C without calculating the presumed print times, and may select the print order that has the least number of paths necessary for printing the target image TI. Generally speaking, the selection unit 30 may select one type of print order according to which the printing of the target image TI is presumed to be completed in the shortest time period.

(Process for Creating and Supplying Print Data (FIG. 5))

Figure 5:
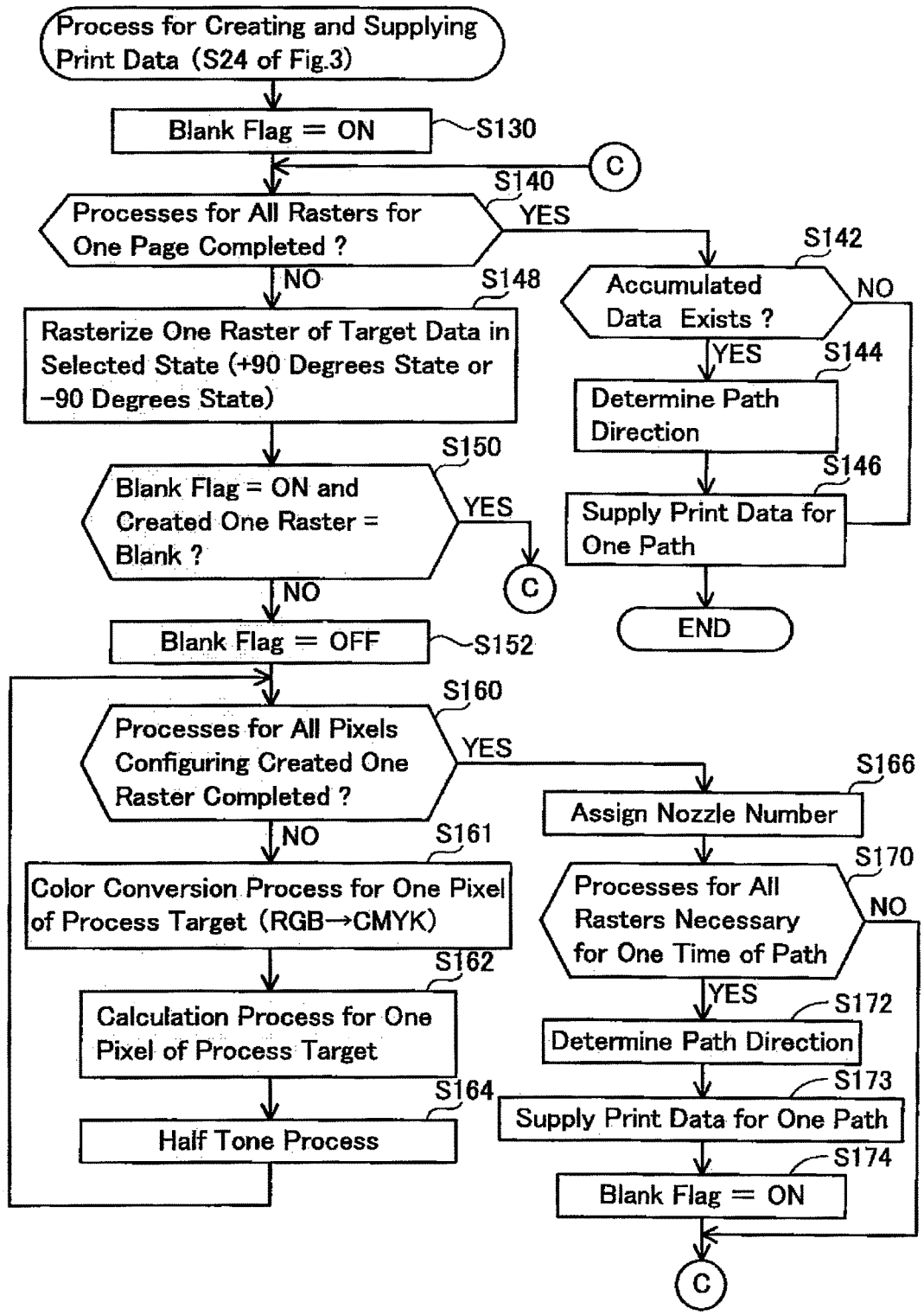
FIG. 5 shows a flowchart of a process for creating and supplying print data.

As shown in FIG. 5, in S130 the print data creation unit 34 (see FIG. 1) sets the blank flag to ON. Next, in S140 the print data creation unit 34 determines whether a raster has been created utilizing all of the target data representing the target image TI for one page. In the case of NO here, in S148 the print data creation unit 34 rasterizes the target data according to the state selected in S20 or S22 of FIG. 3 (the +90 degrees state or the −90 degrees state), creating one raster (called "RGB raster" below) configured by a plurality of pixels represented by 256 tone RGB values. For example, in case the print order for the +90 degrees state was selected in S20 of FIG. 3, the print data creation unit 34 sequentially creates the RGB raster from the long side IL1 to the long side IL2 of the target image TI. Further, in case the print order for the −90 degrees state was selected in S22 of FIG. 3, the print data creation unit 34 sequentially creates the RGB raster from the long side IL2 to the long side IL1 of the target image TI. That is, the print data creation unit 34 sequentially creates the RGB raster in sequence along the print direction of the target image TI.

Furthermore, in S148, the print data creation unit 34 creates the RGB raster according to the print resolution instructed by the user (e.g., 600 dpi×600 dpi). Consequently, the total number of pixels of the plurality of RGB rasters created from all of the target data in the process of S148 performed a plurality of times is greater than the total number of pixels of the RGB data created in S10 of FIG. 3 (e.g., the number of pixels corresponding to 150 dpi×150 dpi). Consequently, the total number of pixels of the CMYK data for print DP (see FIG. 6B) created in process S161 (to be described) is greater than the total number of pixels of the CMYK data for analysis DA (see FIG. 6A) created in S12 of FIG. 3.

Next, in S150 the print data creation unit 34 determines whether the blank flag is ON and whether the created RGB raster is blank. In S150, in case the values of RGB of all the pixels configuring the created RGB raster are all "255", the print data creation unit 34 determines that the created RGB raster is blank. For example, in case the print order for the +90 degrees state was selected in S20 of FIG. 3, YES is determined in S150 for the RGB raster that constitutes the blank area M1 (see FIG. 2B).

Furthermore, as described above, the CMYK data for analysis DA shown in FIG. 6A has a number of pixels corresponding to a print resolution (150 dpi×150 dpi) that is lower than the print resolution instructed by the user (600 dpi×600 dpi). Consequently, as shown in FIG. 6A, since the rasters of X1 lines constitute the blank area M1, in S50 of FIG. 4 the rasters of X1 lines are each determined to be blank. However, in S148 of FIG. 5, rasterizing is performed according to the print resolution instructed by the user (600 dpi×600 dpi). Consequently, rasters of Y1 lines (see FIG. 6B), which are more numerous than the rasters of X1 lines, constitute the blank area M1, and consequently in S150 of FIG. 5 the rasters of Y1 lines are each determined to be blank.

For example, in case the print order for the +90 degrees state was selected in S20 of FIG. 3, NO is determined in S150 for the RGB rasters that constitute the unit area A1 (see FIG. 2B). In this case, in S152 the print data creation unit 34 sets the blank flag to OFF, and proceeds to S160.

Figure 6B:
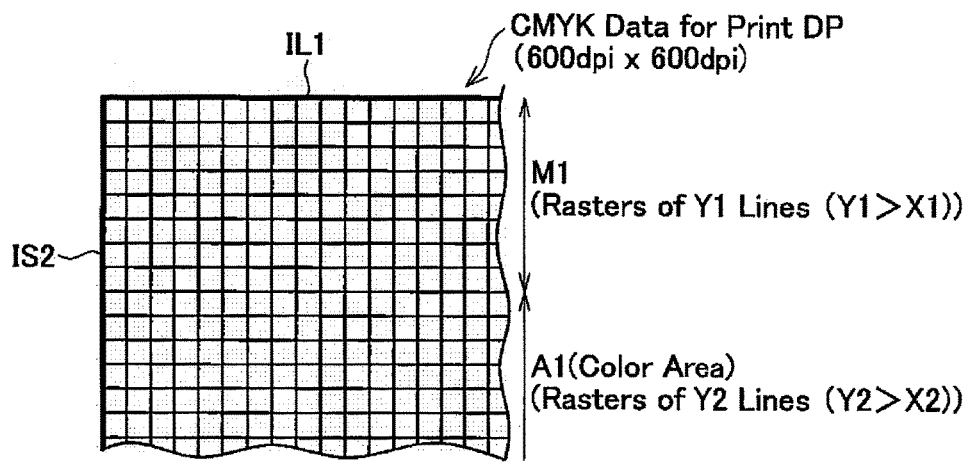
FIG. 6B schematically shows CMYK data for print.

In S160, the print data creation unit 34 determines whether the color conversion process (see S161) has been completed for all the pixels configuring the created RGB raster. In the case of NO here, the print data creation unit 34 selects, from among the plurality of pixels configuring the created RGB raster, a pixel for which the color conversion process of S161 has not been performed as the pixel of the process target Next, in S161 the print data creation unit 34 performs the color conversion process for the pixel of the process target, creating a pixel represented by 256 tone CMYK values. The CMYK data for print DP shown in FIG. 6B is created by sequentially performing the color conversion process of S161.

Next, in S162 the print data creation unit 34 calculates new totals (Ctotal, Mtotal, Ytotal and Ktotal) for each of CMYK utilizing the pixels created in the color conversion process. The process S162 is the same as the process S60 of FIG. 4.

Next, in S164 the print data creation unit 34 performs a half tone process (e.g., a half tone process using the error diffusion method) for the pixels created in the color conversion process, creating pixels represented by four values corresponding to the four types of colors CMYK. Further, the values of the pixels created in the half tone process are represented by two values representing dot ON or dot OFF. Furthermore, in a modified embodiment, in S164 the print data creation unit 34 may create pixels represented by three or more values (e.g., large dot ON, medium dot ON, small dot ON and dot OFF).

When S164 ends, the print data creation unit 34 returns to S160. Consequently, for all the pixels configuring the RGB raster of the process target, the print data creation unit 34 performs the color conversion process of S161, the calculation process of S162 and the half tone process of S164. Consequently, a plurality of pixels after the half tone process (called "print raster of the process target" below) is created from the RGB raster of the process target. In this case, the print data creation unit 34 determines YES in S160, and proceeds to S166.

In S166, the print data creation unit 34 assigns, to the print raster of the process target, a nozzle number indicating the nozzle which will discharge ink droplets onto a position on the paper P corresponding to the print raster of the process target. Thus, by referring to the print data, the printer 50 can know which nozzle will discharge ink droplets.

Next, in S170 the print data creation unit 34 determines whether the color conversion process and the half tone process have been completed for all the RUB rasters necessary for printing one time of path. Furthermore, the number of rasters necessary for printing one time of path is specified based on the print resolution instructed by the user (600 dpi×600 dpi). In the present embodiment, as shown in FIG. 6B, the number of rasters necessary for printing one time of path is Y2 lines. Y2 is larger than X2 shown in FIG. 6A. This is because X2 is a number of lines corresponding to the print resolution (150 dpi×150 dpi) that is lower than the print resolution instructed by the user.

In case the color conversion process and the half tone process have been completed for the RGB rasters of Y2 lines, the print data creation unit 34 determines YES in S170. Thus, a plurality of print rasters representing one unit area printed by one time of main scanning (called "print raster for one path" below) is completed. That is, one unit area is determined. In the case of YES in S170, the print data creation unit 34 proceeds to S172.

The process S172 is the same as process S72 of FIG. 4. That is, in case at least one total from among CMY is greater than "0", the print data creation unit 34 determines that outgoing path OP main scanning is to be performed, and in case all the totals from among CMY are "0", the print data creation unit 34 determines that either outgoing path OP main scanning or returning path RP main scanning is to be performed selectively. In S172, further, in case it was determined that outgoing path OP main scanning is to be performed, the print data creation unit 34 appends, to the print raster for one path, single direction information that indicates outgoing path OP. Further, in case it was determined that either outgoing path OP main scanning or returning path RP main scanning is to be selectively performed, the print data creation unit 34 appends, to the print raster for one path, double direction information indicating that either outgoing path OP main scanning or returning path RP main scanning can be performed selectively. Print data for one path, which represents one unit area, is completed by appending the single direction information or double direction information to the print raster for one path.

Next, in S173 the supplying unit 36 (see FIG. 1) supplies the print data for one path to the printer 50. Furthermore, for example, in case the print order for the +90 degrees state was selected in S20 of FIG. 3, when the print data for one path representing the unit area A1 is to be supplied to the printer 50, the supplying unit 36 supplies, together with the print data for one path, transfer instruction data to the printer 50. The transfer instruction data instructs the paper P to be transferred by a distance corresponding to the blank area M1 for which YES was determined in S150. Similarly, for example, in case the print order for the −90 degrees state was selected in S22 of FIG. 3, the supplying unit 36 supplies, together with the print data for one path representing the unit area A4, transfer instruction data to the printer 50. The transfer instruction data instructs the paper P to be transferred by a distance corresponding to the blank area M3. Further, the supplying unit 36 supplies, together with the print data for one path representing the unit area A5, transfer instruction data to the printer 50. The transfer instruction data instructs the paper P to be transferred by a distance corresponding to the blank area M2.

When S173 ends, the print data creation unit 34 resets the totals of CMYK (Ctotal, etc.) to "0". Next, in S174 the print data creation unit 34 sets the blank flag to ON, and returns to S140. Thus, for example, in case the print order for the +90 degrees state was selected in S20 of FIG. 3, the print data for one path representing the unit area A2 and the print data for one path representing the unit area A3 are sequentially supplied to the printer 50. When the print data for one path representing the unit area A3 has been supplied to the printer 50, YES is determined in S140.

In the case of YES in S140, in S142 the print data creation unit 34 determines whether any one total from among CMYK is greater than "0". The processes S144 and S146, which are performed in case of YES in S142, are the same as the processes S172 and S173. Thus, all of the print data for one page is supplied to the printer 50. In the case of NO in S142, or in case S146 has ended, the process for creating and supplying print data of S24 of FIG. 3 ends. When the process for creating and supplying print data ends, the printer driver process of FIG. 3 ends.

Furthermore, the above target data is data representing only the target image TI for one page. However, the target data may represent the target image for a plurality of pages. In this case, the units 30 to 36 perform the processes S10 to S24 of FIG. 3 for each portion of data representing the target image for one page included in the target data. That is, the units 30 to 36 perform the processes S10 to S24 of FIG. 3 utilizing a portion of data representing the target image of a first page, then perform the processes S10 to S24 of FIG. 3 utilizing a portion of data representing the target image of a second page. Consequently, in the present embodiment, for example, the print order for the +90 degrees state may be selected for the target image of the first page and the print order for the −90 degrees state, this differing from the target image of the first page, may be selected for the target image of the second page.

(Operation of Ink Jet Printer 50)

Operations performed by the printer 50 will be described, these operations being performed according to the print data supplied to the printer 50 from the PC 10 in the process for creating and supplying print data (see FIG. 5) of S24 of FIG. 3.

(In Case Print Order for +90 Degrees State was Selected)

In case the print order for the +90 degrees state was selected in S20 of FIG. 3, the printer 50 first acquires the print data for one path representing the unit area A1 from the PC 10. This print data for one path includes single direction information indicating outgoing path OP main scanning. Further, the transfer instruction data which instructs the paper P to be transferred by a distance corresponding to the blank area M1 is appended to this print data for one path. Consequently, according to the transfer instruction data, the control unit 60 of the printer 50 makes the medium transferring unit 56 transfer the paper P for a distance corresponding to the blank area M1. Next, according to the print data for one path, the control unit 60 makes the head actuating unit 54 perform outgoing path OP main scanning of the print head 52 and makes the head actuating unit 54 discharge ink droplets from the nozzles while the paper P is in a halted state. Thus, printing of the unit area A1 is performed. When the printing of the unit area A1 ends, the control unit 60 makes the medium transferring unit 56 transfer the paper P by a distance corresponding to one unit area.

Next, the printer 50 acquires the print data for one path representing the unit area A2 from the PC 10. This print data for one path includes double direction information. Consequently, according to this print data for one path, the control unit 60 of the printer 50 makes the head actuating unit 54 perform main scanning in which the main scanning of the print head 52 is performed the least number of times possible, i.e., makes the head actuating unit 54 perform returning path RP main scanning of the print head 52 and makes the head actuating unit 54 discharge ink droplets from the nozzles. Thus, a print of the unit area A2 is performed. Similarly, the control unit 60 performs the print of the unit area A3 according to the print data for one path representing the unit area A3. Thus, the print of the target image TI for the +90 degrees state ends.

(In Case Print Order for −90 Degrees State was Selected)

As with the case where the print order for the +90 degrees state was selected, the control unit 60 of the printer 50 performs the print of the unit area A4 according to the print data for one path representing the unit area A4. Furthermore, the print data for one path representing the unit area A5 includes single direction information indicating outgoing path OP main scanning. Consequently, when the printing of the unit area A4 ends, the control unit 60 makes the head actuating unit 54 perform returning path RP main scanning of the print head 52 (i.e., return main scanning performed while ink droplets are not being discharged) while making the medium transferring unit 56 transfer the paper P by a distance corresponding to one unit area. Next, the control unit 60 performs a print of the unit area A5 according to the print data for one path representing the unit area A5. Similarly, the control unit 60 performs a print of the unit area A6 according to the print data for one path representing the unit area A6. Thus, the print of the target image TI for the −90 degrees state ends.

As described above, in either the case where the print order for the +90 degrees state or the case where the print order for the −90 degrees state was selected, the paper P is transferred according to the transfer instruction data and consequently, while the paper P is in the halted state, main scanning for moving the print head 52 above the blank area is not performed (the blank area M1 in the print order for the +90 degrees state, the blank areas M2 and M3 in the print order for the −90 degrees state). That is, in the present embodiment, the printer 50 can perform a print while skipping the blank areas, and consequently rapid printing can be performed.

Furthermore, the printout obtained by printing the target image TI for the +90 degrees state and the printout obtained by printing the target image TI for the −90 degrees state are essentially the same. However, when the paper has been ejected, the direction of the target image TI differs by 180 degrees.

(Effect of the Present Embodiment)

The print system 2 of the first embodiment has been described in detail. According to the present embodiment, the PC 10 creates the CMYK data for analysis DA utilizing the target data, and performs analysis of the CMYK data for analysis DA (see the print path presumption process of FIG. 4). Thus, the PC 10 selects, from among a plurality of types of print order (i.e., the print order for the +90 degrees state and the print order for the −90 degrees state), one type of print order with which the printing of the target image TI is presumed to be completed in the shortest time period (see S20 or S22 of FIG. 3). The PC 10 creates print data for printing the target image TI according to the one type of print order, and supplies this print data to the printer 50 (see the process for creating and supplying print data of FIG. 5). Consequently, the PC 10 may cause the printer 50 to rapidly perform the print of the target image TI on the paper P.

Further, in the present embodiment, the PC 10 performs the print path presumption process of S14 of FIG. 3 utilizing the CMYK data for analysis DA (see FIG. 6) which has a lesser number of pixels than the number of pixels corresponding to the print resolution instructed by the user. Consequently, the time required for the print path presumption process can be made shorter than a configuration in which the print path presumption process of S14 is performed utilizing the CMYK data for print DP, which has a number of pixels corresponding to the print resolution instructed by the user. Furthermore, in the present embodiment, the PC 10 performs analysis utilizing the CMYK data for analysis DA, which has a lesser number of pixels, but in the actual printing utilizes the CMYK data for print DP (further, the print data), which has a greater number of pixels. Consequently, the analysis results do not necessarily conform to the actual printing. Therefore, in a modified embodiment, the selection unit 30 may perform analysis utilizing CMYK data that has the number of pixels corresponding to the print resolution instructed by the user. However, as described above, if a configuration as in the present embodiment is adopted which utilizes the CMYK data for analysis DA that has a lesser number of pixels, the selection unit 30 may select the one type of print order quickly.

The PC 10 and the printer 50 are respectively examples of the "image processing device" and the "print performing unit". The print order for the +90 degrees state and the print order for the −90 degrees state are respectively examples of the "first type of print order" and the "second type of print order". Consequently, the long side IL1 and the long side IL2 of the target image TI are respectively examples of the "first long side" and the "second long side". The outgoing path OP main scanning and the returning path RP main scanning are respectively examples of "one time of main scanning of the print head from the first side to the second side" and "one time of main scanning of the print head from the second side to the first side". As described above, in the first embodiment, outgoing path OP main scanning is adopted for the unit areas which are printed by one or more types of ink from among CMY. Of these types of unit areas, a unit area printed by two or more types of colors of ink from among CMYK (e.g., the unit area A1 which includes green) is an example of the "first type of unit area". Further, a unit area printed only by K ink (e.g., the unit areas A2, A3) is an example of the "second type of unit area". Consequently, K ink is an example of "ink of one specific type of color". Further, the unit area A4 and the unit area A5 are respectively examples of the "first unit area" and the "second unit area". Further, the CMYK data for analysis DA is an example of the "specific data".

Modified Embodiment of the First Embodiment

Points that differ from the first embodiment will be described. In the first embodiment, the medium transferring unit 56 of the printer 50 is capable of transferring the paper P such that the short side PS of the paper P is along the sub scanning direction, but is incapable of transferring the paper P such that the long side PL of the paper P is along the sub scanning direction. In the present modified embodiment, the printer 50 comprises, for example, both a landscape print paper input tray for housing paper having a predetermined size in the landscape direction, and a portrait print paper input tray for housing paper having a predetermined size in the portrait direction. The medium transferring unit 56 of the printer 50 is capable of transferring the paper such that the short side of the paper housed in the landscape print paper input tray is along the sub scanning direction (called "landscape transfer" below) and is capable of transferring the paper such that the long side of the paper housed in the portrait print paper input tray is along the sub scanning direction (called "portrait transfer" below).

Figure 7A:
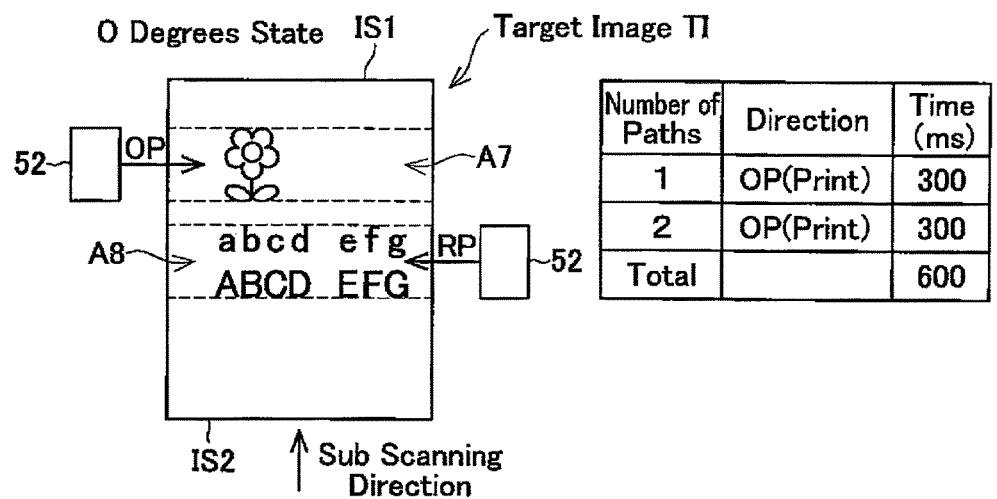
FIG. 7A is a diagram for describing a modified embodiment of the first embodiment.
Figure 7B:
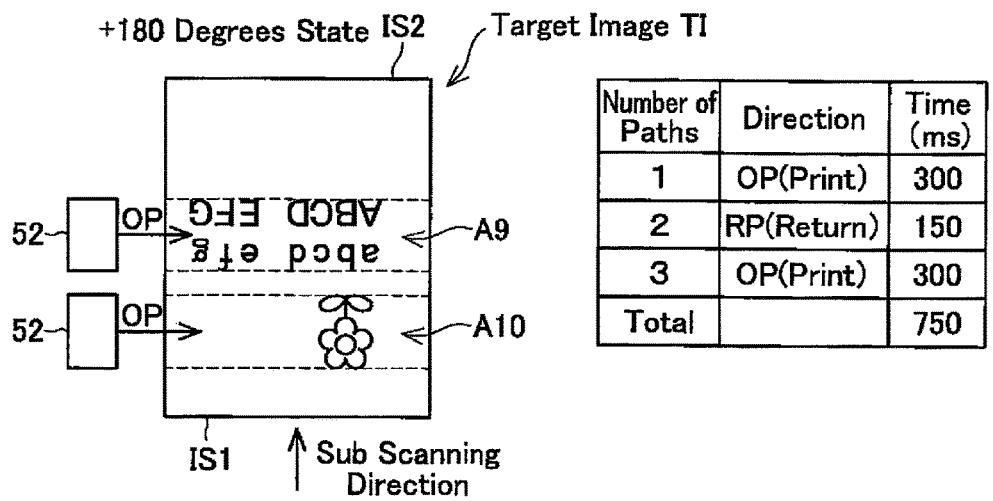
FIG. 7B is a diagram for describing a modified embodiment of the first embodiment.

Consequently, the printer 50 can, as in the first embodiment, perform a landscape transfer of the paper to perform a print such that the long sides IL1, IL2 of the target image TI are along the long side PL of the paper P. However, as shown in FIGS. 7A and 7B, the printer 50 can also perform a portrait transfer of the paper to perform a print such that the long sides IL1, IL2 of the target image TI are along the long side PL of the paper P. FIG. 7A shows a print order for a 0 degrees state (unit areas A7→A8), and FIG. 7B shows a print order for a +180 degrees state (unit areas A9→A10). That is, in the present modified embodiment, the printer 50 can perform the printing of the target image TI according to any of four types of print order: the print order for the 0 degrees state (see FIG. 7A), the print order for the +90 degrees state (see FIG. 2B), the print order for the +180 degrees state (see FIG. 7B) and the print order for the −90 degrees state (see FIG. 2C).

Consequently, in the present modified embodiment, the selection unit 30 of the PC 10 creates, in S14 of FIG. 3, not only the print orders for the +90 degrees state and the −90 degrees state, but also creates tables indicating the number of paths (see FIGS. 7A and 7B) for the print orders for both the 0 degrees state and the +180 degrees state. In S16 of FIG.

3, the selection unit 30 further calculates the presumed print time of the 0 degrees state and the presumed print time of the +180 degrees state and, in S18 to S22, selects the one type of print order in which the presumed print time is shortest from among the four types of print order. In the present modified embodiment, the presumed print time (600 (ms)) of the print order for the 0 degrees state shown in FIG. 7A is shortest, and so the selection unit 30 selects the print order for the 0 degrees state.

Next, in S24 of FIG. 3, the print data creation unit 34 and the supplying unit 36 create print data for making the printer 50 perform a print according to the print order for the 0 degrees state, and supply this print data to the printer 50.

According to the present modified embodiment, the PC 10 can make the printer 50 print the target image TI on the paper more quickly. Furthermore, the print order for the 0 degrees state can be expressed, for example, as "a third type of print order for sequentially printing the target image TI from the first short side IS1 to the second short side IS2 of the target image TI by performing a plurality of times of main scanning of the print head 52". Further, the print order for the +180 degrees state can be expressed, for example, as "a fourth type of print order for sequentially printing the target image TI from the second short side IS2 to the first short side IS1 of the target image TI by performing a plurality of times of main scanning of the print head 52".

Second Embodiment

Points that differ from the first embodiment will be described. In the present embodiment, as with the modified embodiment of the first embodiment, the printer 50 is capable of performing both landscape transfer of the paper and portrait transfer of the paper. FIGS. 8A1, 8A2, 8B1, B2 show target images TI1, TI2 of the present embodiment. Furthermore, the target images TI1, TI2 include only monochrome images.

As shown in FIGS. 8A1 and 8A2, the target image TI1 includes a horizontal writing character string (e.g., an English character string). In case of printing this type of target image TI1, two times of main scanning are required for printing unit areas A21, A22 in the print order for the 0 degrees state (see FIG. 8A1), and three times of main scanning are required for printing unit areas A23 to A25 in the print order for the +90 degrees state (see FIG. 8A2). Consequently, the print order for the 0 degrees state is usually suitable for printing the target image TI1 which includes the horizontal writing character string. This is because, in case of printing the target image TI1 according to the print order for the 0 degrees state, the print can be performed skipping more blank areas M4, M5, M6 than in the case of printing the target image TI1 according to the print order for the +90 degrees state.

On the other hand, as shown in FIGS. 8B1 and 8B2, the target image TI2 includes a vertical writing character string (e.g., a Japanese character string). In case of printing this type of target image TI2, three times of main scanning are required for printing unit areas A26 to A28 in the print order for the 0 degrees state (see FIG. 8B1), and two times of main scanning are required for printing unit areas A29, A30 in the print order for the +90 degrees state (see FIG. 8B2). Consequently, the print order for the +90 degrees state is usually suitable for printing the target image TI2 which includes the vertical writing character string. This is because, in case of printing the target image TI2 according to the print order for the +90 degrees state, the print can be performed skipping more blank areas M7, M8 than in the case of printing the target image TI2 according to the print order for the 0 degrees state.

As is clear from the above description, both in printing the target image TI1 which includes the horizontal writing character string and in printing the target image TI2 which includes the vertical writing character string, a print order is usually suitable in which the main scanning of the print head 52 is performed along the alignment direction of the plurality of characters that configure one character string (the print order for the 0 degrees state in the case of the horizontal writing character string, and the print order for the +90 degrees state in the case of the vertical writing character string). In view of these findings, the printer driver 26 of the present embodiment realizes the process of FIG. 9 instead of the process of FIG. 3.

Figure 9:
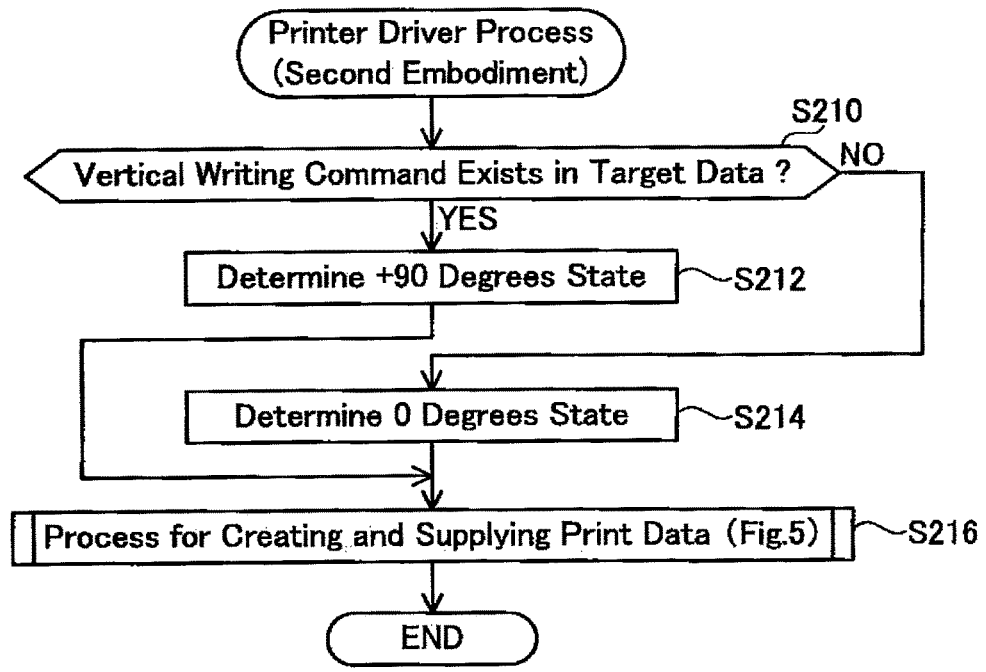
FIG. 9 shows a flowchart of the printer driver process of the second embodiment.

As shown in FIG. 9, in S210 the selection unit 30 analyzes the target data, and determines whether a vertical writing command exists in the target data. In case a vertical writing command exists in the target data, the selection unit 30 determines YES in S210, and selects the print order for the +90 degrees state in S212. Further, in case a vertical writing command does not exist in the target data, the selection unit 30 determines NO in S210, and selects the print order for the 0 degrees state in S214. Next, in S216, the print data creation unit 34 and the supplying unit 36 create print data for making the printer 50 perform a print according to the print order selected in S212 or S214, and supply this print data to the printer 50. The process S216 is the same as the process of FIG. 5 of the first embodiment.

According to the present embodiment, the PC 10 analyzes the target data and, based on the alignment direction of the plurality of characters that configure the character string included in the target image TI1 or TI2, selects the one type of print order in which the print of the target image is presumed to be completed in the shortest time period from among the plurality of types of print order (i.e., the print order for the 0 degrees state and the print order for the +90 degrees state). The PC 10 creates print data for causing a print of the target image according to the one type of print order, and supplies this print data to the printer 50. Consequently, the PC 10 can cause the printer 50 to print the target image on the paper rapidly. Furthermore, in the present embodiment, the two types of print order, the print order for the 0 degrees state and the print order for the +90 degrees state, are an example of the "plurality of types of print order".

Modified Embodiment 1

In the above embodiments, the PC 10 comprises the units 30 to 36. However, instead, the printer 50 may comprise the units 30 to 36. In this case, the printer 50 is an example of the "image processing device", and the supplying unit 36 within the printer 50 may supply print data to a print performing unit within the printer 50 (i.e., a print processing unit that performs print processing for controlling the head actuating unit 54 and the medium transferring unit 56).

Modified Embodiment 2

In the second embodiment, the selection unit 30 selects the print order based on whether a vertical writing command exists in the target data. Instead, in case the target data is described by a first type of language which uses only horizontal writing, such as English, French, German, etc. (i.e., in case a character code for the first type of language exists in the target data), the selection unit 30 may select the print order for the 0 degrees state, and in case the target data is described by a second type of language (e.g., Japanese, etc.) which differs from the first type of language (i.e., in case a character code for the second type of language exists in the target data), the selection unit 30 may select the print order for the +90 degrees state.

Modified Embodiment 3

In the second embodiment, in case the vertical writing command exists in the target data (the case of YES in S210 of FIG. 9), the selection unit 30 may perform the print path presumption process of FIG. 4 with the print order for the +90 degrees state and the print order for the −90 degrees state as the target, and may select the print order in which the presumed print time is shorter. Further, in case the vertical writing command does not exist in the target data (the case of NO in S210 of FIG. 9), the selection unit 30 may perform the print path presumption process of FIG. 4 with the print order for the 0 degrees state and the print, order for the +180 degrees state as the target, and may select the print order in which the presumed print time is shorter. According to this configuration, the printer 50 can be made to perform the print of the target image more quickly. In the present modified embodiment, the four types of print order are an example of the "plurality of types of print order".

Modified Embodiment 4

In the first embodiment, in S14 of FIG. 3 the selection unit 30 creates the tables of FIGS. 2B and 2C by analyzing the CMYK data for analysis DA. Instead, the specific data creation unit 32 may perform the half tone process on the CMYK data for analysis DA, create data after the half tone process, and analyze the data after the half tone process (e.g., data represented by the two values dot ON or dot OFF), thereby creating the tables of FIGS. 2B and 2C. For example, in case any one value indicates dot ON of the CMY of one pixel configuring a unit area, the selection unit 30 may determine that outgoing path OP main scanning is to be performed for the printing of that unit area. In the present modified embodiment, the data after the half tone process is an example of the "specific data".

Modified Embodiment 5

In the first embodiment, the selection unit 30 creates the tables of FIGS. 2B and 2C by analyzing the CMYK data for analysis DA that represents the entire area of the target image TI for one page. Instead, the specific data creation unit 32 may create CMYK data for analysis that represents only a partial area of the target image TI for one page, and the selection unit 30 may perform an analysis of this CMYK data for analysis. For example, the specific data creation unit 32 may create CMYK data for analysis that represents a rectangle shape partial image defined by the entire short side IS1 of the target image TI and half the long side IL1 of the target image TI (the part with the number 100 in FIG. 2A). This partial image does not include the letters "A"~"G", but since it includes the flower illustration and the letters "a"~"g", the selection unit 30 can create tables similar to FIGS. 2B and 2C by performing a print path presumption process similar to S14 of FIG. 3. That is, generally speaking, the selection unit 30 may perform an analysis utilizing the entire area of the target image TI for one page, as in the first embodiment, or may perform an analysis utilizing only a part of the area of the target image TI for one page, as in the present modified embodiment. Furthermore, in the present modified embodiment, the selection unit 30 performs an analysis of half the long side IL1 of the target image TI (the part with the number 100 in FIG. 2A). However, the selection unit 30 may perform an analysis of a length shorter than half the long side IL1, or perform an analysis of a length longer than half the long side IL1. It is preferred that the selection unit 30 performs analysis of a length necessary for printing at least one path. According to the present modified embodiment, the time period required for analysis can be shortened.

Modified Embodiment 6

In the first embodiment, in case the target data represents a target image for a plurality of pages, the selection unit 30 performs analysis utilizing, for each partial data for one page included in the target data, that partial data for one page. That is, the selection unit 30 selects one type of print order for each page. Consequently, in the first embodiment, a plurality of sheets of paper can be ejected from the printer 50 such that the direction of the image of each page is different. Instead, any of the methods of modified embodiments 6-1 to 6-4 may be adopted. Any of these methods is included in the configuration wherein "an analysis is performed by utilizing the target data representing a target image of a print target, so as to select, from among a plurality of types of print orders for printing the target image, one type of print order in which a print of the target image is presumed to be completed in the shortest time period".

Modified Embodiment 6-1

In case the target data represents a target image for a plurality of pages, the selection unit 30 may perform an analysis utilizing all of the target data (i.e., create tables indicating the total number of paths of the plurality of pages (see FIGS. 2B and 2C)), and may select one type of print order that is in common for the plurality of pages. Consequently, in the present modified embodiment, since the entire target image for the plurality of pages is printed according to the same print order, the plurality of sheets of paper is ejected from the printer 50 such that the direction of the image of the pages is identical.

Modified Embodiment 6-2

In case the target data represents a target image for a plurality of pages, the selection unit 30 may perform an analysis utilizing only a portion of data representing, for example, the first page of the target image (i.e., create tables indicating only the number of paths of the first page (see FIGS. 2B and 2C)), and may select one type of print order that is in common for the plurality of pages. Consequently, in the present modified embodiment, also, the plurality of sheets of paper is ejected from the printer 50 such that the direction of the image of the pages is identical.

Modified Embodiment 6-3

For example, in case the number of pages is comparatively small, even if the plurality of sheets of paper is ejected from the printer 50 such that the direction of the image of the pages is different, the user can easily perform an operation to adjust the direction of the image of the pages. However, in case the number of pages is comparatively large, the user would need time to perform the operation to adjust the direction of the image of the pages. Taking this type of situation into consideration, in case the number of pages represented by the target data is comparatively small (in case the number of pages is equal to or below a threshold value), the method of the first embodiment above may be adopted (the method in which one type of print order is selected for each page), and in case the number of pages represented by the target data is comparatively large (in case the number of pages is greater than the threshold value), the method of the modified embodiment 6-1 above may be adopted (the method in which, based on all of the target data, one type of print order is selected in common for all the pages), or the method of the modified embodiment 6-2 above may be adopted (the method in which, based on only the partial data of, for example, the first page of the target data, one type of print order is selected in common for all the pages).

Modified Embodiment 6-4

For example, in case the number of pages is comparatively small, the time necessary for analysis utilizing all of the target data is short. However, in case the number of pages is comparatively large, the time necessary for analysis utilizing all of the target data becomes longer. Taking this type of situation into consideration, in case the number of pages represented by the target data is comparatively small, the method of the first embodiment above may be adopted (the method in which one type of print order is selected for each page) or the method of the modified embodiment 6-1 above may be adopted (the method in which, based on all of the target data, one type of print order is selected in common for all the pages) and, in case the number of pages represented by the target data is comparatively large, the method of the modified embodiment 6-2 above may be adopted (the method in which, based on only the partial data of, for example, the first page of the target data, one type of print order is selected in common for all the pages).

Modified Embodiment 7

In the first embodiment above, outgoing path OP main scanning is performed for a unit area that is printed using only one type of ink from among CMY. Instead, either outgoing path OP main scanning or returning path RP main scanning may be performed selectively for a unit area that is printed using only one type of ink from among CMY. That is, (1) outgoing path OP main scanning may be performed for a first type of unit area that is printed using two or more types of ink from among CMYK, (2) outgoing path OP main scanning or returning path main scanning may be performed selectively for a second type of unit area that is printed using only K ink and (3) outgoing path OP main scanning or returning path main scanning may be performed selectively for a third type of unit area that is printed using only one type of ink from among CMY.

Modified Embodiment 8

In the above embodiments, the units 30 to 36 are realized by software (the printer driver 26). However, at least one among the units 30 to 36 may be realized by hardware, such as a logic circuit, etc.

The invention claimed is:

1. An image processing device for a print performing unit, wherein the print performing unit performs a movement of a print head along a main scanning direction and a transfer of a print medium along a sub scanning direction so as to perform a print of an image on the print medium, the image processing device comprising:
one or more processors; and
a memory storing computer-readable instructions therein, the computer-readable instructions, when executed by one or more processors, causing the image processing device to perform:
generating specific data representing a target image;
analyzing the specific data in a first type of print order and analyzing the specific data in a second type of print order, the first type of print order being a print order for sequentially printing the target image having a substantially rectangle shape from a first side of the target image to a second side of the target image which is the opposite side of the first side by performing a plurality of times of main scanning of the print head, the second type of print order being a print order for sequentially printing the target image from the second side of the target image to the first side of the target image by performing a plurality of times of main scanning of the print head,
each of the first type of print order and the second type of print order is a print order assuming that each of the following conditions is satisfied:
(A) each of a plurality of unit areas in the target image is printed by performing one time of main scanning of the print head;
(B) a first type of unit area included in the plurality of unit areas is printed by performing one time of main scanning of the print head from a first side of the main scanning direction to a second side of the main scanning direction, and the first type of unit area is an area to be printed by the print head discharging inks of a plurality of types of colors; and
(C) a second type of unit area included in the plurality of unit areas is printed by selectively performing either one time of the main scanning of the print head from the first side of the main scanning direction to the second side of the main scanning direction or one time of main scanning of the print head from the second side of the main scanning direction to the first side of the main scanning direction, and the second type of unit area is an area to be printed by the print head discharging only an ink of one specific type of color;
determining, in accordance with the result of the analyzing, whether the printing in the first type of print order is presumed to be completed in a shorter time period than the printing in the second type of print order;
selecting the first type of print order, in a case where the specific data represents a first target image, when determined that the printing in the first type of print order is presumed to be completed in shorter time period than the printing in the second type of print order, and select the second type of print order, in a case where the specific data represents a second target image which is different from the first target image, when determined that the printing in the first type of print order is not presumed to be completed in a shorter time period than the printing in the second type of print order;

generating print data in accordance with the selected one of the first type of print order and the second type of print order, the print data being data for causing the print performing unit to perform the print of the target image; and supplying the print data to the print performing unit, wherein the analyzing includes specifying, by analyzing the specific data in the first type of print order, a first number of times of outgoing main scanning of the print head and a second number of times of returning main scanning of the print head and a second number of times of returning main scanning of the print head which are necessary for printing the target image in the first type of print order, and specifying, by analyzing the specific data in the second type of print order, a third number of times of outgoing main scanning of the print head and a fourth number of times of returning main scanning of the print head which are necessary for printing the target image in the second type of print order, and in accordance with the specified first, second, third, and fourth number of times, it is determined whether the printing in the first type of print order is presumed to be completed in shorter time period than the printing in the second type of print order.

2. The image processing device as in claim 1, wherein each of the first type of print order and the second type of print order is a print order assuming that the following condition is further satisfied:

(D1) in a case where an initial unit area included in the plurality of unit areas is determined, if an edge of the target image includes a blank area, the initial unit area is determined such that the initial unit area does not include the blank area.

3. The image processing device as in claim 1, wherein each of the first type of print order and the second type of print order is a print order assuming that the following condition is further satisfied:

(D2) in a case where a second unit area included in the plurality of unit areas is determined after a first unit area included in the plurality of unit areas is determined, if the target image includes a blank area adjacent to a specific side of the first unit area, the second unit area is determined such that the second unit area does not include the blank area, the specific side being a side located at the second unit area side.

4. The image processing device as in claim 1, wherein the print performing unit is capable of transferring the print medium such that a short side of the print medium is along the sub scanning direction, and is capable of moving the print head along a long side of the transferred print medium, in a case where the print performing unit is to perform the print of the target image on the print medium such that a long side of the target image having a substantially rectangle shape for one page is along the long side of the print medium:

the first type of print order is a print order for sequentially printing the target image from a first long side of the target image to a second long side of the target image by performing a plurality of times of main scanning of the print head; and the second type of the print order is a print order for sequentially printing the target image from the second long side of the target image to the first long side of the target image by performing a plurality of times of main scanning of the print head.

5. The image processing device as in claim 1, wherein it is determined that the printing in the first type of print order is presumed to be completed in shorter time period than the printing in the second type of print order in a case where a number of times of main scanning of the print head required for the printing in the first type of print order is less than a number of times of main scanning of the print head required for the printing in the second type of print order, and it is determined that the printing in the first type of print order is not presumed to be completed in shorter time period than the printing in the second type of print order, in a case where a number of times of main scanning of the print head required for the printing in the first type of print order is greater than a number of times of main scanning of the print head required for the printing in the second type of print order.

6. The image processing device as in claim 1, wherein the specific data is generated by utilizing target data, the specific data having a second number of pixels which is less than a first number of pixels corresponding to a specific print resolution to be utilized in the print of the target image, and the print data is generated for causing the print performing unit to perform the print of the target image with the specific print resolution.

7. A non-transitory computer readable storage medium that stores a computer program for an image processing device for a print performing unit, wherein the print performing unit performs a movement of a print head along a main scanning direction and a transfer of a print medium along a sub scanning direction so as to perform a print of an image on the print medium, wherein the computer program includes instructions for causing one or more processors mounted on the image processing device to execute processes comprising:

generating specific data representing a target image;

analyzing the specific data in a first type of print order and analyzing the specific data in a second type of print order, the first type of print order being a print order for sequentially printing the target image having a substantially rectangle shape from a side of the target image to a second side of the target image which is the opposite side of the first side by performing a plurality of times of main scanning of the print head, the second type of print order being a print order for sequentially printing the target image from the second side of the target image to the first side of the target image by performing a plurality of times of main scanning of the print head, each of the first type of print order and the second type of print order is a print order assuming that each of the following conditions is satisfied:

(A) each of a plurality of unit areas in the target image is printed by performing one time of main scanning of the print head;

(B) a first type of unit area included in the plurality of unit areas is printed by performing one time of main scanning of the print head from a first side of the main scanning direction to a second side of the main scanning direction, and the first type of unit area is an area to be printed by the print head discharging inks of a plurality of types of colors; and (C) a second type of unit area included in the plurality of unit areas is printed by selectively performing either one time of the main scanning of the print head from the first side of the main scanning direction to the second side of the main scanning direction or one time of main scanning of the print head from the second side of the main scanning direction to the first side of the main scanning direction, and the second type of unit area is an area to be printed by the print head discharging only an ink of one specific type of color;

determining, in accordance with the result of the analyzing, whether the printing in the first type of print order is presumed to be completed in a shorter time period than the printing in the second type of print order;

selecting the first type of print order, in a case where the specific data represents a first target image, when determined that the printing in the first type of print order is presumed to be completed in a shorter time period than the printing in the second type of print order, and selecting the second type of print order, in a case where the specific data represents a second target image which is different from the first target image, when determined that the printing in the first type of print order is not presumed to be completed in shorter time period than the printing in the second type of print order;

generating print data in accordance with the selected one of the first type of print order and the second type of print order, the print data being data for causing the print performing unit to perform the print of the target image; and supplying the print data to the print performing unit, wherein the analyzing includes specifying, by analyzing the specific data in the first type of print order, a first number of times of outgoing main scanning of the print head and a second number of times of returning main scanning of the print head and a second number of times of returning main scanning of the print head which are necessary for printing the target image in the first type of print order, and specifying, by analyzing the specific data in the second type of print order, a third number of times of outgoing main scanning of the print head and a fourth number of times of returning main scanning of the print head which are necessary for printing the target image in the second type of print order, and in accordance with the specified first, second, third, and fourth number of times, it is determined whether the printing in the first type of print order is presumed to be completed in shorter time period than the printing in the second type of print order.

8. A method performed in an image processing device for a print performing unit, wherein the print performing unit performs a movement of a print head along a main scanning direction and a transfer of a print medium along a sub scanning direction so as to perform a print of an image on the print medium, the method comprising:

generating specific data representing a target image;

analyzing the specific data in a first type of print order and analyzing the specific data in a second type of print order, the first type of print order being a print order for sequentially printing the target image having a substantially rectangle shape from a first side of the target image to a second side of the target image which is the opposite side of the first side by performing a plurality of times of main scanning of the print head, the second type of print order being a print order for sequentially printing the target image from the second side of the target image to the first side of the target image by performing a plurality of times of main scanning of the print head, each of the first type of print order and the second type of print order is a print order assuming that each of the following conditions is satisfied:
(A) each of a plurality of unit areas in the target image is printed by performing one time of main scanning of the print head;
(B) a first type of unit area included in the plurality of unit areas is printed by performing one time of main scanning of the print head from a first side of the main scanning direction to a second side of the main scanning direction, and the first type of unit area is an area to be printed by the print head discharging inks of a plurality of types of colors; and
(C) a second type of unit area included in the plurality of unit areas is printed by selectively performing either one time of the main scanning of the print head from the first side of the main scanning direction to the second side of the main scanning direction or one time of main scanning of the print head from the second side of the main scanning direction to the first side of the main scanning direction, and the second type of unit area is an area to be printed by the print head discharging only an ink of one specific type of color;

determining, in accordance with the result of the analyzing, whether the printing in the first type of print order is presumed to be completed in a shorter time period than the printing in the second type of print order;

selecting the first type of print order, in a case where the specific data represents a first target image, when determined that the printing in the first type of print order is presumed to be completed in shorter time period than the printing in the second type of print order, and selecting the second type of print order, in a case where the specific data represents a second target image which is different from the first target image, when determined that the printing in the first type of print order is not presumed to be completed in a shorter time period than the printing in the second type of print order;

generating print data in accordance with the selected one of the first type of print order and the second type of print order, the print data being data for causing the print performing unit to perform the print of the target image; and supplying the print data to the print performing unit, wherein the analyzing includes specifying, by analyzing the specific data in the first type of print order, a first number of times of outgoing main scanning of the print head and a second number of times of returning main scanning of the print head and a second number of times of returning main scanning of the print head which are necessary for printing the target image in the first type of print order, and specifying, by analyzing the specific data in the second type of print order, a third number of times of outgoing main scanning of the print head and a fourth number of times of returning main scanning of the print head which are necessary for printing the target image in the second type of print order, and in accordance with the specified first, second, third, and fourth number of times, it is determined whether the printing in the first type of print order is presumed to be completed in shorter time period than the printing in the second type of print order.

\* \* \* \* \*